US009036554B2

(12) United States Patent
Merino Vazquez et al.

(10) Patent No.: US 9,036,554 B2
(45) Date of Patent: May 19, 2015

(54) POLICY AND CHARGING CONTROL METHODS

(71) Applicant: Telefonaktiebolaget LM Ericsson (publ), Stockholm (SE)

(72) Inventors: Emiliano Merino Vazquez, Leganes (ES); Monica Alonso Sabrido, Madrid (ES); Yolanda Garcia Serrano, Pozuelo de Alarcon (ES); Angel Navas Cornejo, Leganes (ES); Gema Segura Cava, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 168 days.

(21) Appl. No.: 13/754,942

(22) Filed: Jan. 31, 2013

(65) Prior Publication Data

US 2013/0279406 A1  Oct. 24, 2013

Related U.S. Application Data

(60) Provisional application No. 61/643,944, filed on May 8, 2012.

(30) Foreign Application Priority Data

Apr. 24, 2012 (EP) ..................................... 12165315

(51) Int. Cl.
*H04W 48/18* (2009.01)
*H04L 29/06* (2006.01)
(Continued)

(52) U.S. Cl.
CPC ........... *H04W 48/18* (2013.01); *H04L 65/1016* (2013.01); *H04L 12/1407* (2013.01); *H04L 65/1073* (2013.01); *H04M 15/66* (2013.01)

(58) Field of Classification Search
CPC .................................................. H04L 65/1073
See application file for complete search history.

(56) References Cited

U.S. PATENT DOCUMENTS

2007/0086581 A1* 4/2007 Zhu et al. ................... 379/88.17
2010/0182985 A1* 7/2010 Guenther et al. ............. 370/338
(Continued)

OTHER PUBLICATIONS

3GPP TS 23.203 V10.5.0 (Dec. 2011); Technical Specification Group Services and System Aspects; Policy and charging control architecture (Release 10); (available on http://www.3gpp.org/ftp/Specs/htmlinfo/ 23203.htm).
(Continued)

*Primary Examiner* — Joseph Blanton
(74) *Attorney, Agent, or Firm* — Baker Botts, LLP

(57) ABSTRACT

An IMS registration and session initiation is disclosed for a user equipment (UE). The UE has a subscription identifier comprising an IMSI and/or MSISDN. A PDN-GW establishes (s10) an IP-CAN session with a PCRF, for the UE, by transmitting, to the PCRF, the subscription identifier of the UE and an IP address assigned to the UE. The PCRF binds (s20) the subscription identifier to the IP address assigned to the UE for the IP-CAN session. Then, upon the UE initiating the IMS registration, a P-CSCF transfers (s30), to an S-CSCF, an IMPU. The S-CSCF obtains (s40), based on the IMPU, the subscription identifier of the UE from a user database. The S-CSCF transfers (s50) to the P-CSCF the obtained subscription identifier of the UE. The P-CSCF binds (s60) the subscription identifier of the UE to the IMPU. Then, upon the UE initiating an IMS session associated with the IMPU, the P-CSCF establishes (s70) an AF session towards the PCRF with the subscription identifier bound to the IMPU. The PCRF then identifies (s80) the correct IP-CAN session by matching the subscription identifier with the one of the IP-CAN session.

16 Claims, 19 Drawing Sheets

(51) Int. Cl.
*H04M 15/00* (2006.01)
*H04L 12/14* (2006.01)

(56) References Cited

U.S. PATENT DOCUMENTS

2010/0223222 A1* 9/2010 Zhou et al. .................... 706/47
2012/0144048 A1* 6/2012 Jarvenpaa et al. ............ 709/228

OTHER PUBLICATIONS

3GPP TS 24.229 V10.6.0 (Dec. 2011), Technical Specification Group Core 20 Network and Terminals; IP multimedia call control protocol based on Session Initiation Protocol (SIP) and Session Description Protocol (SDP); Stage 3 (Release 10);, especially section 7.10.
3GPP TS 23.335 V10.0.0 (Mar. 2011), Technical Specification Group Core Network and Terminals; User Data Convergence (UDC); Technical realization and information flows; Stage 2 (Release 10).
M.Handley et al, RFC 4566, SDP: Session Description Protocol, The Internet Society, Network Working Group, Jul. 2006.
European Search Report issued in Application No. EP 12 16 5315.
3GPP TS 23.203, "3$^{rd}$ Generation Partnership Project; Technical Specification Group Services and System Aspects; Policy and Charging Control Architecture (Release 11)," V11.5.0, Mar. 2012.
Nokia et al., "Session Correlation in Emergency SRVCC," S2-092362, 3$^{rd}$ Generation Partnership Project (3GPP), Mar. 30-Apr. 3, 2009.
Alcatel, "Architectural Choices for a Relationship Between IP MM CC and (Access IP-Connectivity) Bearer Control," S2-001702, 3$^{rd}$ Generation Partnership Project (3GPP), Oct. 9-12, 2000.
Nokia Siemens Networks, "Discussion on PCRF Selection," C3-070985, 3$^{rd}$ Generation Partnership Project (3GPP), Nov. 5-9, 2007.
Orange, "Barring and Roaming Restrictions," S2-032102, 3$^{rd}$ Generation Partnership Project (3GPP), May 12-16, 2003.
Vodafone, "Providing the IMSI to the S-CSCF," C4-113023, 3$^{rd}$ Generation Partnership Project (3GPP), Nov. 14-18, 2011.
3PGG TS 24.229 V11.6.0 (Dec. 2012)—Technical Specification, "3$^{rd}$ Generation Partnership Project", *Technical Specification Group Core Network and Terminals; IP multimedia call control protocol based on Session Initiation Protocol (SIP) and Session Description Protocol (SDP); Stage 3 (Release 11)*, 249 pgs.
3PGG TS 24.214 V11.7.0 (Dec. 2012)—Technical Specification, "3$^{rd}$ Generation Partnership Project", *Technical Specification Group Core Network and Terminals; Policy and Charging Control over Rx reference point (Release 11)*, 53 pgs.
J. Rosenberg, "A Session Initiation Protocol (SIP) Event Package for Registrations", *Network Working Group—dynamicsoft*, Mar. 2004, 27 pgs.

* cited by examiner

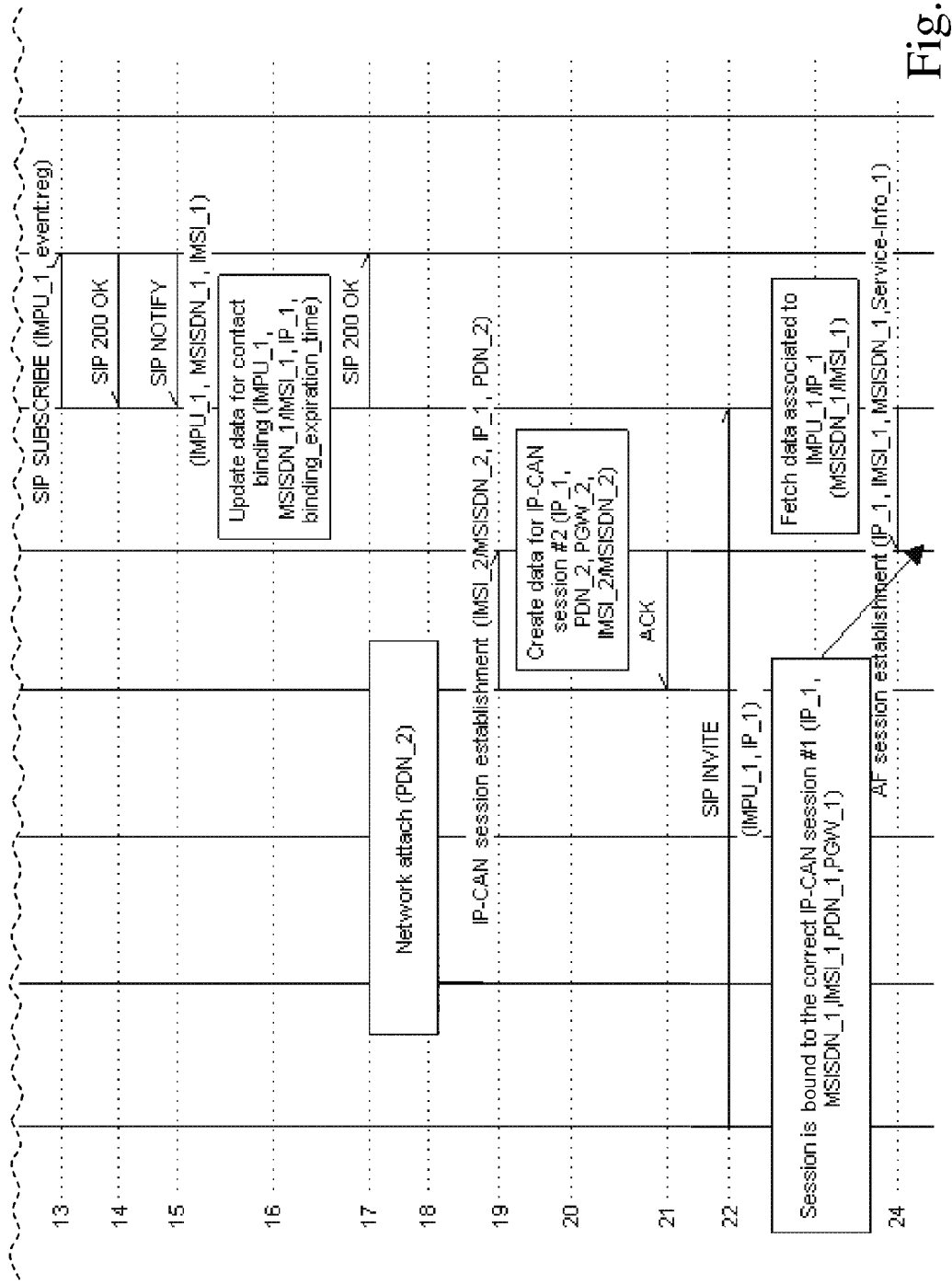

POLICY AND CHARGING CONTROL METHODS

This application claims priority to EP Patent Application No. 12165315.8 filed 24 Apr. 2012 and claims the benefit of U.S. Prov. Application No. 61/643,944 filed May 7, 2012, the entire contents of each of which are hereby incorporated by reference.

TECHNICAL FIELD

The present invention relates to policy and charging control methods, and in particular to methods for participating in an Internet Protocol (IP) Multimedia Subsystem (IMS) registration and session initiation for a user equipment (UE). The invention also relates to network nodes for participating in such an IMS registration and session initiation. The invention also relates to computer program products and computer programs comprising computer-executable instructions configured for implementing the above-mentioned methods on network nodes.

BACKGROUND

In communication networks, such as telecommunication networks, a call or a service often involves, on the one hand, a control plane or signalling plane and, on the other hand, a user plane or media plane. The control plane or signalling plane is in charge of establishing and managing a connection between two points on the network. The user plane or media plane is in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules, which may be user-specific, a policy decision element, function or point, and a policy enforcement element, function or point. The purposes of a policy framework include controlling subscriber access to the networks and services.

A policy framework notably addresses the decisions as to whether the subscriber is entitled, or authorized, to enjoy a service, and whether the network can provide the service to the subscriber (and with which quality of service).

Policy and charging control architectures, such as, but not limited to, the architecture described in "3*GPP TS* 23.203 *V*10.5.0 (2011-12); *Technical Specification Group Services and System Aspects; Policy and charging control architecture (Release* 10)" (available on http://www.3gpp.org/ftp/Specs/html-info/23203.htm), integrate the policy and charging control.

In such a policy and charging control (PCC) architecture, the policy and charging rules function (PCRF) is a functional entity in charge of deciding charging, policies and QoS for services of a given user. The PCRF may for instance decide the quality of the connection to be allocated for voice, video, etc, which results, for example, on the establishment of dedicated bearer(s) with guaranteed bit rate (GBR) or non guaranteed bit rate (non GBR). The PCRF may also make decisions about packet forwarding treatment in the radio access network (RAN) by means of determining the quality of service (QoS) class identifier (QCI). The PCRF may also decide, at the packet core control plane, the priority of a bearer to be established over other bearers, for the same or different users, by providing allocation and retention priority (ARP) information.

Based on the above decisions by the PCRF, PCC rules may be generated and installed in a policy and charging enforcement function (PCEF) of the PCC architecture, so that each service is given the appropriate treatment that the service requires. Apart from the PCRF and PCEF, the PCC architecture may also include an application function (AF) interposed between the user and the service to obtain service information to be submitted to the PCRF so that the PCRF can decide the appropriate PCC rules to install in the PCEF.

In operation, where an AF detects service activities for a user (e.g. a voice call), the AF may interact with the PCRF to provide service information and service data flows (SDF). This may lead to the installation of the SDF and the decided QoS information in the PCEF. The PCEF may for instance check if an existing bearer can be used for the SDF or if a new bearer needs be established. If a new bearer is to be established, an ARP value may reflect the importance of this bearer in relation to other bearers at the packet core network and radio access network.

It is desirable to provide methods to improve PCC architectures and implementations, notably by providing a more reliable and efficient PCC architecture without increasing, or at least without excessively increasing, the implementation and architecture complexity and the associated equipment costs.

SUMMARY

To meet or at least partially meet the above-mentioned goals, methods, network nodes, computer programs and computer program products according to the invention are defined in the independent claims. Advantageous embodiments are defined in the dependent claims.

In one embodiment, a method is provided for participating in an IMS registration and session initiation for a UE. The UE has, or is associated with, a so-called subscription identifier comprising at least one of an IMSI and a MSISDN. The method includes (i) establishing, by a packet data network gateway (PDN-GW), an Internet Protocol connectivity access network (IP-CAN) session with a PCRF, for the UE, by transmitting, to the PCRF, at least the subscription identifier of the UE, and an Internet Protocol (IP) address assigned to the UE; (ii) binding, by the PCRF, the subscription identifier to the IP address assigned to the UE for the IP-CAN session; (iii) upon the UE initiating the IMS registration, transferring, from a proxy call session control function (P-CSCF), to a serving call session control function (S-CSCF), an IP multimedia public identity (IMPU); (iv) obtaining, by the S-CSCF, based on the IMPU, the subscription identifier of the UE from a user database (i.e., a database storing user-related information); (v) transferring, by the S-CSCF to the P-CSCF, the obtained subscription identifier of the UE; (vi) binding, by the P-CSCF, the subscription identifier of the UE to the IMPU; (vii) upon the UE initiating an IMS session associated with the IMPU, establishing, by the P-CSCF, an AF session towards the PCRF with the subscription identifier bound to the IMPU; and (viii) identifying, by the PCRF, the correct IP-CAN session by matching the received subscription identifier with the subscription identifier of the IP-CAN session.

The method enables the PCRF to handle operator's network configurations involving the use of the same IP address for network connections established for two or more different UEs. It has been recognized that, in some network configurations, the same IP address may be used by different UEs at the same time, causing an ambiguity at the PCRF. This may occur when two different PDN-GWs assign the same IP address, and the two PDN-GWs request the same PCRF to set PCC rules. To avoid that the PCRF attempts to identify the network connection bound to the UE based on the IP address, which may be reused, a subscription identifier, comprising at least one of a IMSI and a MSISDN, is passed through the involved IMS nodes on to the P-CSCF so that the binding between the IMS session and the network connection can be properly made based on the subscription identifier. In such a manner, the ambiguity generated by the reuse of the same IP address for different UEs is lifted. The establishment of an IP-CAN session with the PCRF, as well as the identification of the IP-CAN session during further procedures is less prone to errors, thus providing a more reliable and efficient PCC architecture.

In one embodiment, the step of transferring, from the P-CSCF to the S-CSCF, the IMPU, comprises transferring a Session Initiation Protocol (SIP) register request to the S-CSCF.

In one embodiment, the method further includes, after obtaining, by the S-CSCF, the subscription identifier of the UE from the user database, storing, by the S-CSCF, the subscription identifier of the UE.

In one embodiment, the method further includes, upon the UE initiating the IMS registration, receiving, by the P-CSCF, the IP address assigned to the UE, and the IMPU.

In one embodiment, the step of binding, by the P-CSCF, the subscription identifier of the UE to the IMPU comprises: binding the IP address assigned to the UE to the IMPU and the subscription identifier of the UE.

In one embodiment, the step of establishing, by the P-CSCF, the application function session towards the PCRF comprises: transmitting, to the PCRF, the subscription identifier of the UE and the IP address assigned to the UE. In a sub-embodiment, the P-CSCF may also transmit the IMPU to the PCRF for purposes of further consistency checks.

In one embodiment, the step of identifying, by the PCRF, the correct IP-CAN session comprises: matching the received subscription identifier and IP address with those subscription identifier and IP address associated with the IP-CAN session. This enables the PCRF to distinguish between IP-CAN sessions established for the same UE with the same or different IP addresses.

The above-described embodiments may be combined to form further embodiments.

The invention also relates to a network node comprising a PCRF. In one embodiment, the network node comprising the PCRF participates in an IMS registration and session initiation for a UE, wherein the UE has a subscription identifier comprising at least one of an IMSI and a MSISDN. The network node is configured for: (i') participating in establishing an IP-CAN session with a PDN-GW for the UE, by receiving, from the PDN-GW, at least the subscription identifier of the UE, and an IP address assigned to the UE; (ii') binding the subscription identifier to the IP address assigned to the UE for the IP-CAN session; (iii') participating in establishing, with a P-CSCF, an AF session by at least receiving the subscription identifier from the P-CSCF; and (iv') identifying the correct IP-CAN session by matching the received subscription identifier with the subscription identifier of the IP-CAN session.

The invention also relates to a network node comprising a P-CSCF. In one embodiment, the network node comprising a P-CSCF participates in an IMS registration and session initiation for a UE, wherein the UE has a subscription identifier comprising at least one of an IMSI and a MSISDN. The network node is configured for: (i") upon the UE initiating the IMS registration, transmitting, to a S-CSCF, an IMPU used by the UE during the IMS registration; (ii") receiving, from the S-CSCF, the subscription identifier of the UE; (iii") binding the subscription identifier of the UE to the IMPU; and (iv"), upon the UE initiating an IMS session associated with the IMPU, participating in establishing an AF session with a PCRF, with the subscription identifier bound to the IMPU. The subscription identifier is sent to the PCRF for the purpose of identifying a corresponding IP-CAN session at the PCRF.

The invention also relates to a network node comprising an S-CSCF. In one embodiment, the network node comprising an S-CSCF participates in an IMS registration for a UE, wherein the UE has a subscription identifier comprising at least one of an IMSI and a MSISDN. The network node is configured for: (i'") receiving, from a P-CSCF, an IMPU (i.e., the IMPU that has been used by the UE during the IMS registration); (ii'") obtaining, based on the IMPU, the subscription identifier of the UE from a user database (i.e., a database storing user-related information); and (iii'") transmitting, to the P-CSCF, the obtained subscription identifier of the UE.

The invention also relates to computer program products and computer programs comprising computer-executable instructions configured, when executed on a network node or a computer, to cause the network node or computer to participate in a method according to any one of the above-described embodiments, or to implement the functions of a network node according to any one of the above-described embodiments.

BRIEF DESCRIPTION OF THE DRAWINGS

Embodiments of the present invention shall now be described, in conjunction with the appended figures, in which:

FIGS. 10a and 10b, which should be read together, form a message sequence chart schematically illustrating a method in one embodiment of the invention, when no implicit registration set exists;

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
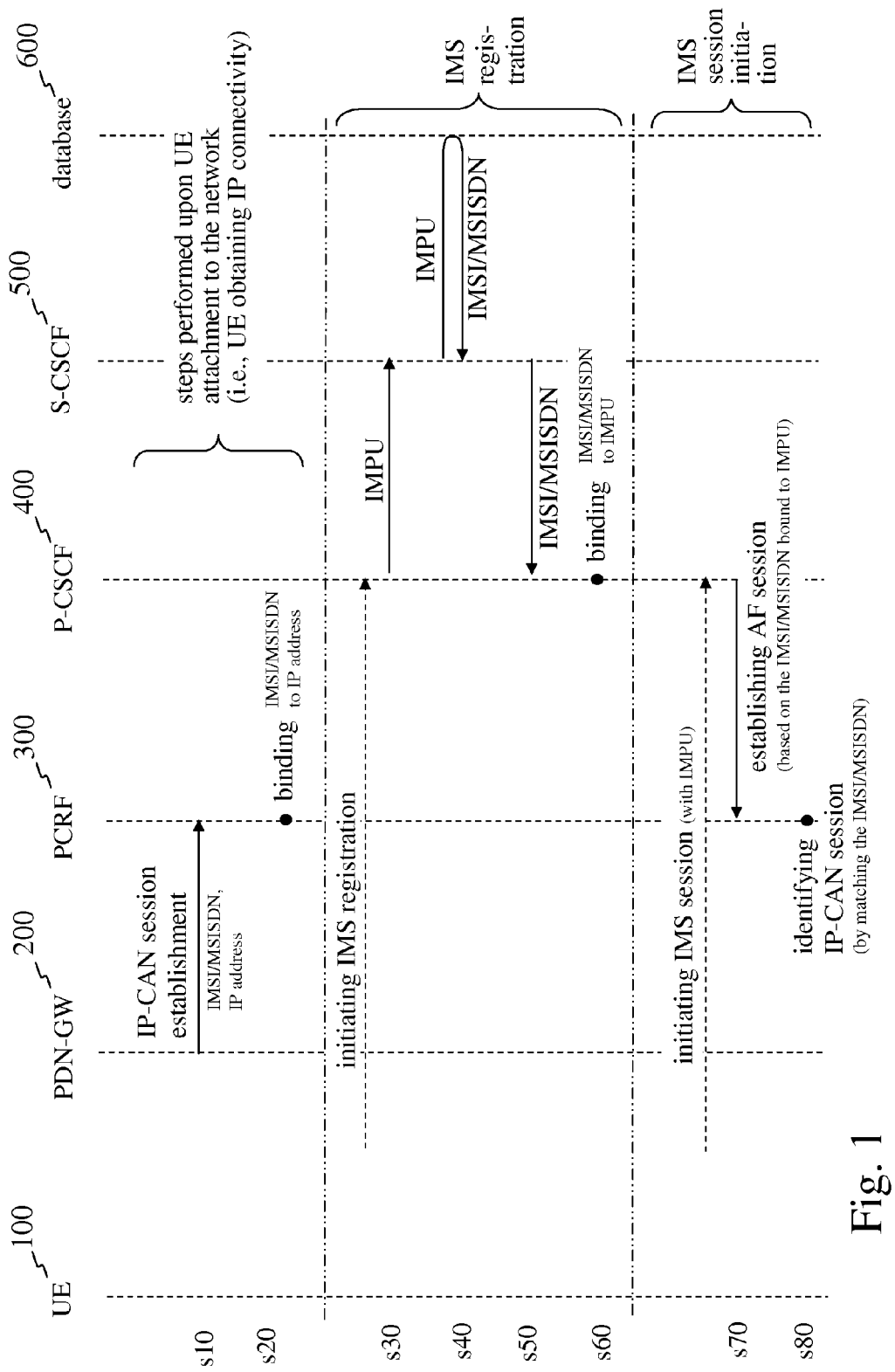
FIG. 1 is a message sequence chart illustrating a method in one embodiment of the invention.

FIG. 1 is a message sequence chart illustrating the exchange of messages between entities in a method according to one embodiment of the invention. The method illustrated in FIG. 1 involves a UE 100, a PDN-GW 200, a PCRF 300, a P-CSCF 400, an S-CSCF 500, and a database 600. Each of these entities may be hosted on different network nodes. Database 600 may include subscription-related information and may therefore be called "user database".

In step s10, PDN-GW 200 establishes an IP-CAN session with PCRF 300 by sending, to PCRF 300, an IMSI and/or MSISDN and an IP address assigned to the IP connection established for the UE 100. In other words, upon a user (UE 100) attaching a packet data network (PDN), PDN-GW 200 establishes, in step s10, an IP-CAN session for the user with PCRF 300 by sending a unique subscription identifier (IMSI and/or MSISDN) and IP address assigned for UE 100. Then, in step s20, PCRF 300 binds (i.e., associates) the IMSI and/or MSISDN to the IP address. In other words, PCRF 300 binds, in step s20, the received subscription identifier (IMSI and/or MSISDN) and IP address for the IP-CAN session. The association (binding) may be stored on the network node hosting PCRF 300 or on a network node accessible by PCRF 300. Steps s10 and s20 are performed upon UE attachment to the network, i.e. when UE 100 is obtaining IP connectivity. UE 100 may be any type of user equipment such as a mobile phone, a smartphone, a laptop, a tablet PC, a wireless sensor, a gaming device, etc.

Then, in step s30, when UE 100 initiates an IMS registration with an IMPU towards a P-CSCF 400 of an IMS network (for instance to prepare a Voice over IP call), P-CSCF 400 transfers, to S-CSCF 500, the IMPU used for the IMS registration. That is, P-CSCF 400 submits the IMS registration with the IMPU towards an S-CSCF 500 assigned for serving the user. Then, in step s40, S-CSCF 500 obtains from database 600 (a subscriber server) a user profile for the user, which includes the IMSI and/or MSISDN (the subscription identifier) associated with UE 100, based on the IMPU. In step s50, S-CSCF 500 transmits the IMSI and/or MSISDN to P-CSCF 400. In step s60, P-CSCF 500 binds (i.e., associates) the IMSI and/or MSISDN to the IMPU used for the IMS registration of the UE 100. Steps s30 to s60 are carried out during the IMS registration in accordance with the present embodiment.

Then, when UE 100 initiates an IMS session based on the IMPU towards P-CSCF 400, P-CSCF 400 establishes, in step s70, an AF session with PCRF 300 based on the IMSI and/or MSISDN bound to the IMPU. In step s80, PCRF 300 is then able to identify the IP-CAN session to which rules are to be applied by comparing the IMSI and/or MSISDN received from P-CSCF 400 with the corresponding attributes of the IP-CAN sessions.

In such a manner, PCRF 300 may identify, efficiently and without ambiguity, the correct IP-CAN session, even when the same IP address is assigned to two different UEs.

Since P-CSCF 400 has a binding between the subscription identifier (IMSI and/or MSISDN) and the IMPU (see step s60), and since, in addition, PCRF 300 has a binding between the subscription identifier (IMSI and/or MSISDN) and the IP address associated with the IP-CAN session (see step s20), both PCRF 300 and P-CSCF 400 can identify the IP-CAN session at a later stage by using the subscription identifier. That is, when UE 100 later requests a service to P-CSCF 400 with the IMPU, P-CSCF 400 can fetch the subscription identifier (IMSI and/or MSISDN) bound with the IMPU, P-CSCF 400 can establish an AF session towards PCRF 300 with the subscription identifier (IMSI and/or MSISDN) and, optionally, the IMPU, and PCRF 300 can identify the IP-CAN session by matching the received unique subscription identifier (IMSI, MSISDN) with the one bound to the IP-CAN session.

Although FIG. 1 involves four entities, more entities may be involved. For instance, an interrogating call session control function (I-CSCF) may be involved. An I-CSCF is typically located at the edge of an administrative domain and may notably be in charge of querying a database to retrieve the address of the S-CSCF to be contacted for a UE. The P-CSCF may find the I-CSCF based on the registrar domain (e.g., request-URI in SIP REGISTER). Furthermore, although FIG. 1 illustrates eight steps, additional steps may be performed. This also applies to the other embodiments within the present disclosure.

An IP-CAN session is an association between a UE and an IP network. Some exemplary properties of an IP-CAN session are for instance described in "3GPP TS 29.212 V10.5.0 (2011-12); Technical Specification Group Core Network and Terminals; Policy and Charging Control (PCC) over Gx reference point (Release 10)" (see especially page 12, section 3.1, following "IP-CAN session: . . ."). The establishment of an IP-CAN session is made when the IP address is assigned to the UE. In other words, the UE obtains, or is provided with, IP connectivity when the IP-CAN session is established. The IP address may be an IPv4 or IPv6 address.

A PDN gateway (PDN-GW) is a network node (or a functional entity hosted on a network node) providing connectivity from the UE to packet data networks. In particular, a PDN-GW may also be, in one embodiment, a gateway GPRS support node GGSN of a General Packet Radio Service (GPRS) network. A PDN-GW may implement a PCEF (or the network node hosting the PDN-GW may also host a PCEF) to perform policy enforcement and related tasks for each user. The role of the PCC architecture and the role in particular of the PCRF, PCEF and AF functions are known in the art, and these roles have been discussed in the above "Background" section. A PCRF has typically an access to a subscription profile repository (SPR) to provide subscription-based input to the PCRF. The decided rules are installed by the PCRF on the PCEF through a Gx interface. An AF session is a session towards a network node comprising an AF. The AF is in charge of detecting that a user has initiated or has received a request, and the AF then provides service information and service data flows (SDF) to the PCRF (for instance through an AA-request) through an Rx interface.

The IMS is an architectural framework for delivering IP multimedia services. The IMS framework helps providing access to multimedia and voice applications from UEs connected to an access network. An IMS registration may notably involve the dynamic allocation of an IMPU to one or several UEs. An IMS registration may imply the authentication of the UE. Once a UE has performed the necessary IMS registration, an IMS session can be initiated, which may for instance be done by sending, by the UE, a SIP INVITE message. Call session control functions (CSCFs) are implemented on network nodes to process signalling messages (such as SIP signalling packets) in the IMS architecture. In particular, a P-CSCF acts as IMS entry point and may be collocated with an AF of the PCC architecture. To at least some extent, a P-CSCF may behave as an AF of the PCC architecture. The S-CSCF is located in the home network and acts as central node in the signalling plane. The S-CSCF may be capable of accessing a subscription-related database such as a home subscriber server (HSS) to obtain user profiles.

The IMSI, or international mobile subscriber identity, is an identifier allocated to each mobile subscriber. Some exemplary properties of an IMSI are for instance described in "3GPP TS 23.003 V10.4.0 (2011-12); *Technical Specification Group Core Network and Terminals; Numbering, addressing and identification (Release* 10)", sections 2.1 to 2.3. The MSISDN is a number to be dialled for reaching the mobile subscriber. An exemplary structure of an MSISDN is described in 3GPP TS 23.003 (already mentioned above), section 3.3. The IMSI is not a public user identity, whereas the MSISDN is a public user identity.

A binding is a generally temporary association between identifiers, or other data, within a network node, such as for instance between an IMSI and/or MSISDN and an IP address in a PCRF.

Identifying, in step s80, the correct IP-CAN session by matching the received subscription identifier with the subscription identifier of the IP-CAN session may comprise, or consist in, comparing the subscription identifier received by the PCRF 300 from the P-CSCF 400 (in step s70) with the subscription identifier characterizing the IP-CAN session.

Figure 2:
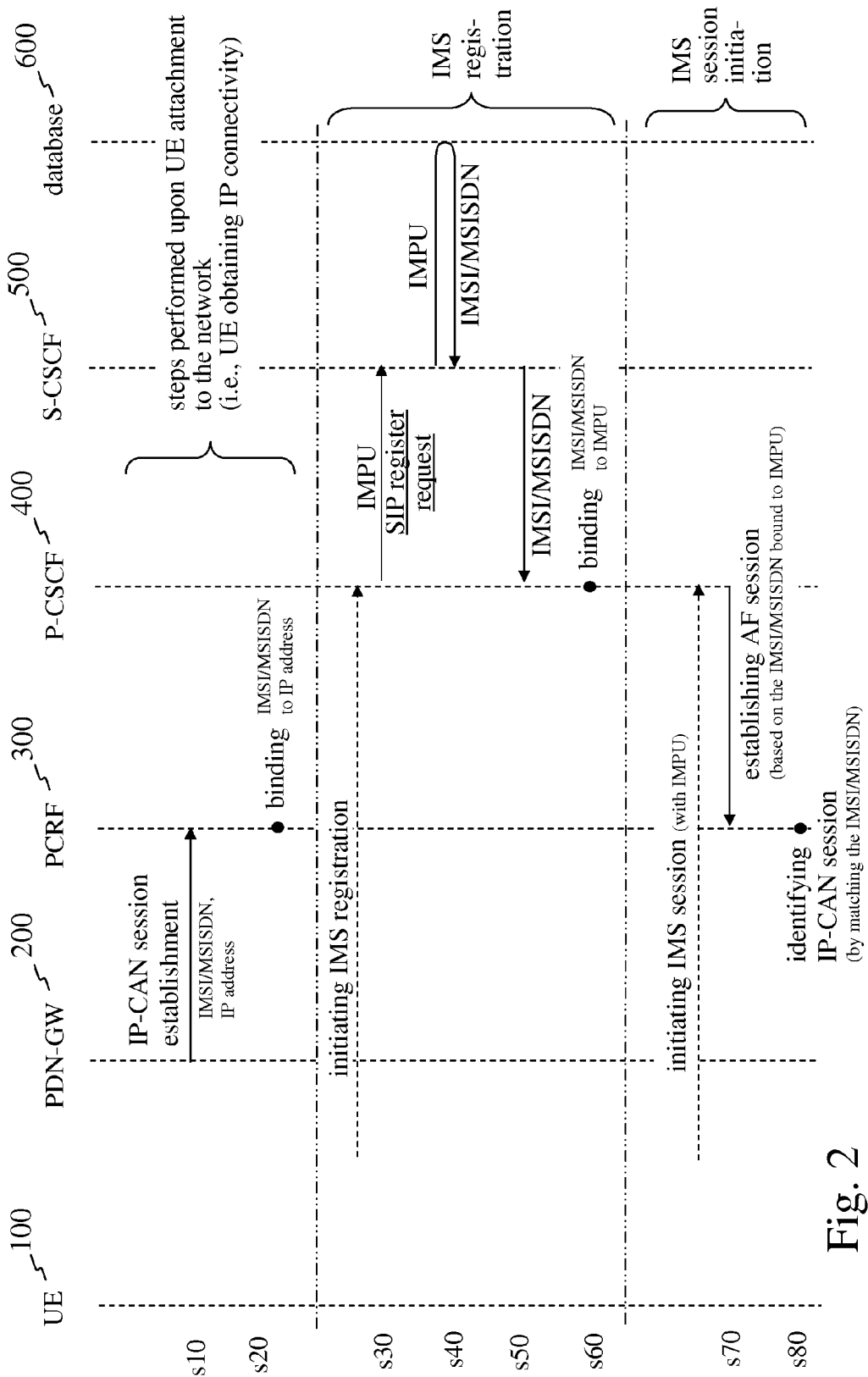
FIG. 2 is a message sequence chart illustrating a method in one embodiment of the invention, wherein the transfer, from the P-CSCF to the S-CSCF, of the IMPU is made using a SIP register request.

FIG. 2 is a message sequence chart illustrating a method in one embodiment of the invention, which differs from the method illustrated in FIG. 1, in that, in step s30, P-CSCF 400 transmits the IMPU to S-CSCF 500 in a SIP register request (also capitalized as follows: "SIP REGISTER").

The Session Initiation Protocol (SIP) is for instance described in "J. Rosenberg et al., *RFC* 3261, *SIP: Session Initiation Protocol, The Internet Society, Network Working Group, June* 2002". SIP provides a framework to initiate, maintain, and terminate sessions between computers, and may be especially useful when communication sessions, such as voice or video calls over IP, are involved.

Figure 3:
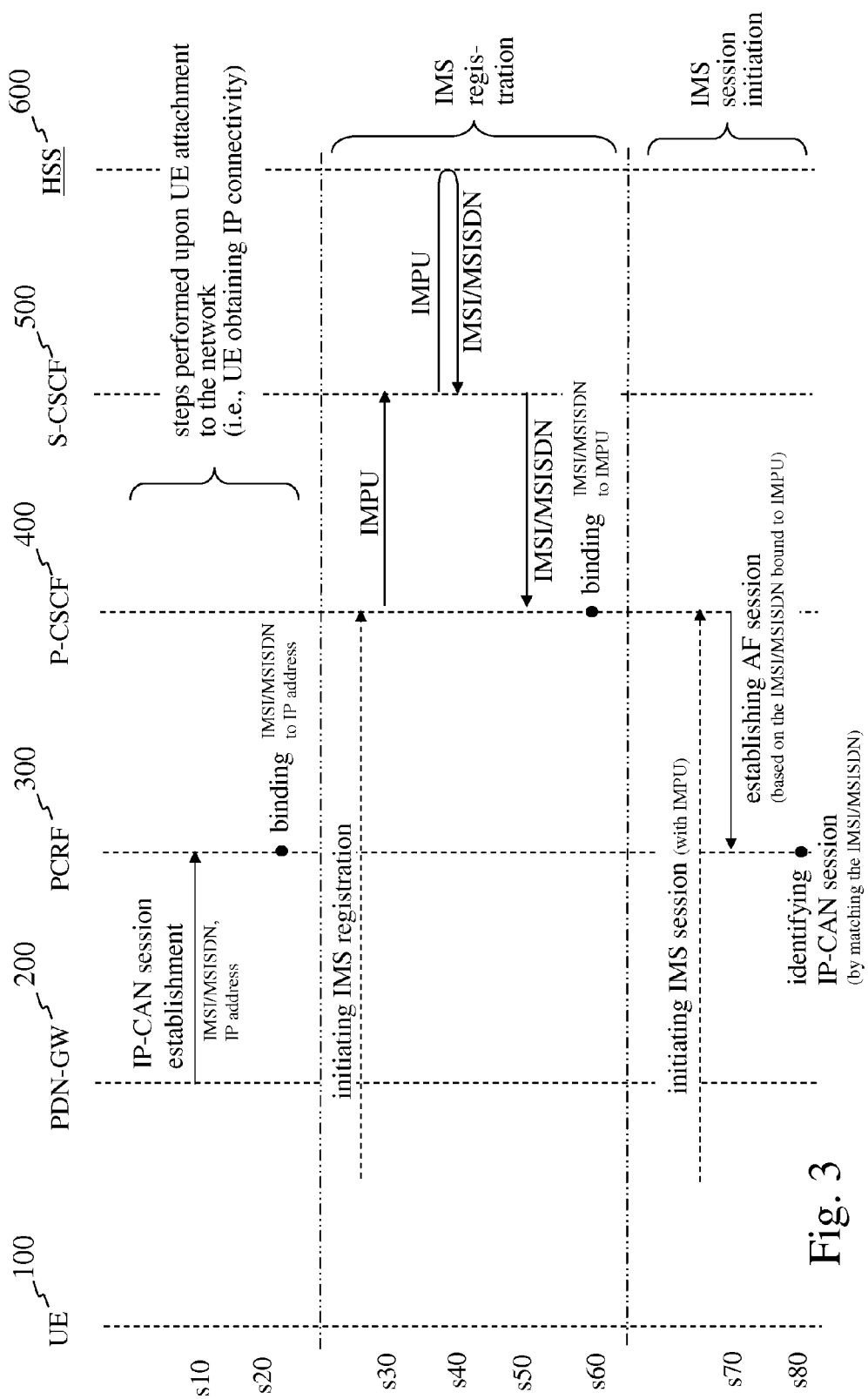
FIG. 3 is a message sequence chart illustrating a method in one embodiment of the invention, wherein the database from which the S-CSCF obtains the subscription identifier of the UE, based on the IMPU, is an HSS.

FIG. 3 is a message sequence chart illustrating a method in one embodiment of the invention, showing in particular, compared to FIG. 1, that database 600 may be a home subscriber server (HSS). A HSS is one of the components of the IMS framework. In particular, a HSS is a database storing subscriber information.

Figure 4:
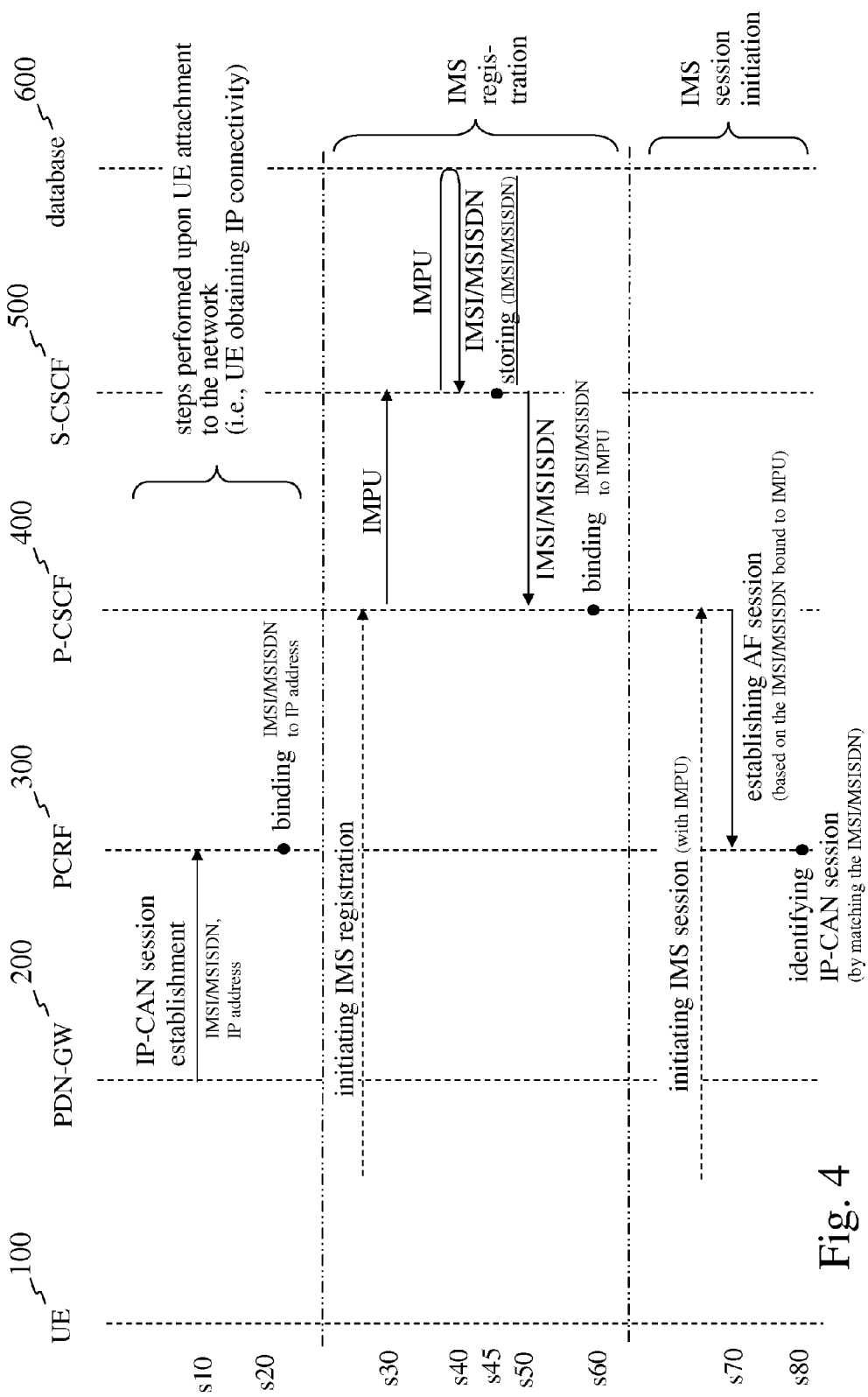
FIG. 4 is a message sequence chart illustrating a method in one embodiment of the invention, wherein the S-CSCF, after obtaining the subscription identifier of the UE from the user database, stores the subscription identifier.

FIG. 4 is a message sequence chart illustrating a method in one embodiment of the invention, which differs from the method illustrated in FIG. 1 in that S-CSCF 500 stores, in step s45, the IMSI and/or MSISDN obtained from database 600 in step s40.

Figure 5:
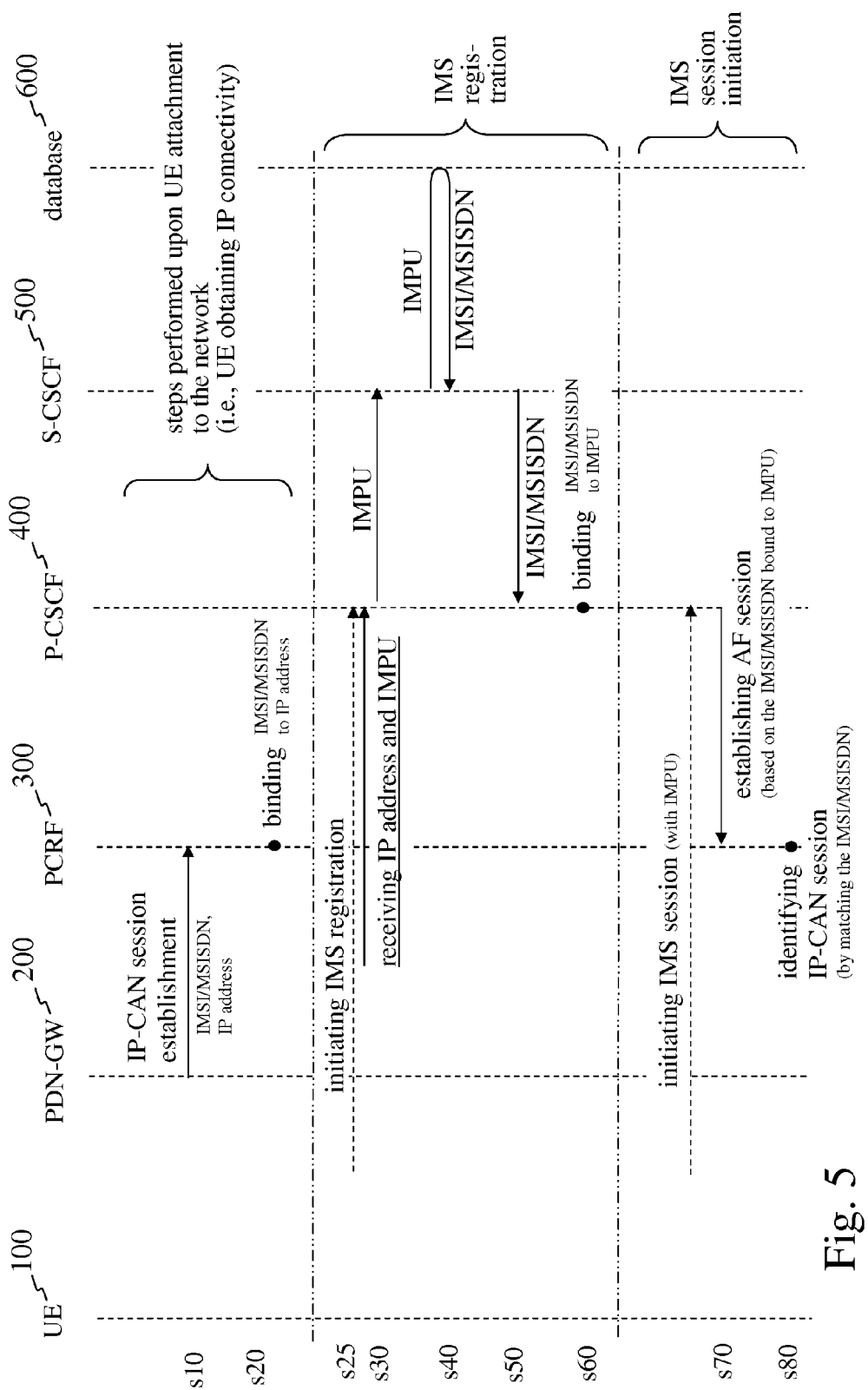
FIG. 5 is a message sequence chart illustrating a method in one embodiment of the invention, wherein, upon the UE initiating the IMS registration, the P-CSCF receives the IP address assigned to the UE as well as the IMPU.

FIG. 5 is a message sequence chart of a method in one embodiment of the invention which differs from the method illustrated in FIG. 1 in that, upon IMS registration, P-CSCF 400 receives, in step s25, the IP address assigned to UE 100 and the IMPU associated with the IMS registration being initiated for UE 100.

Figure 6:
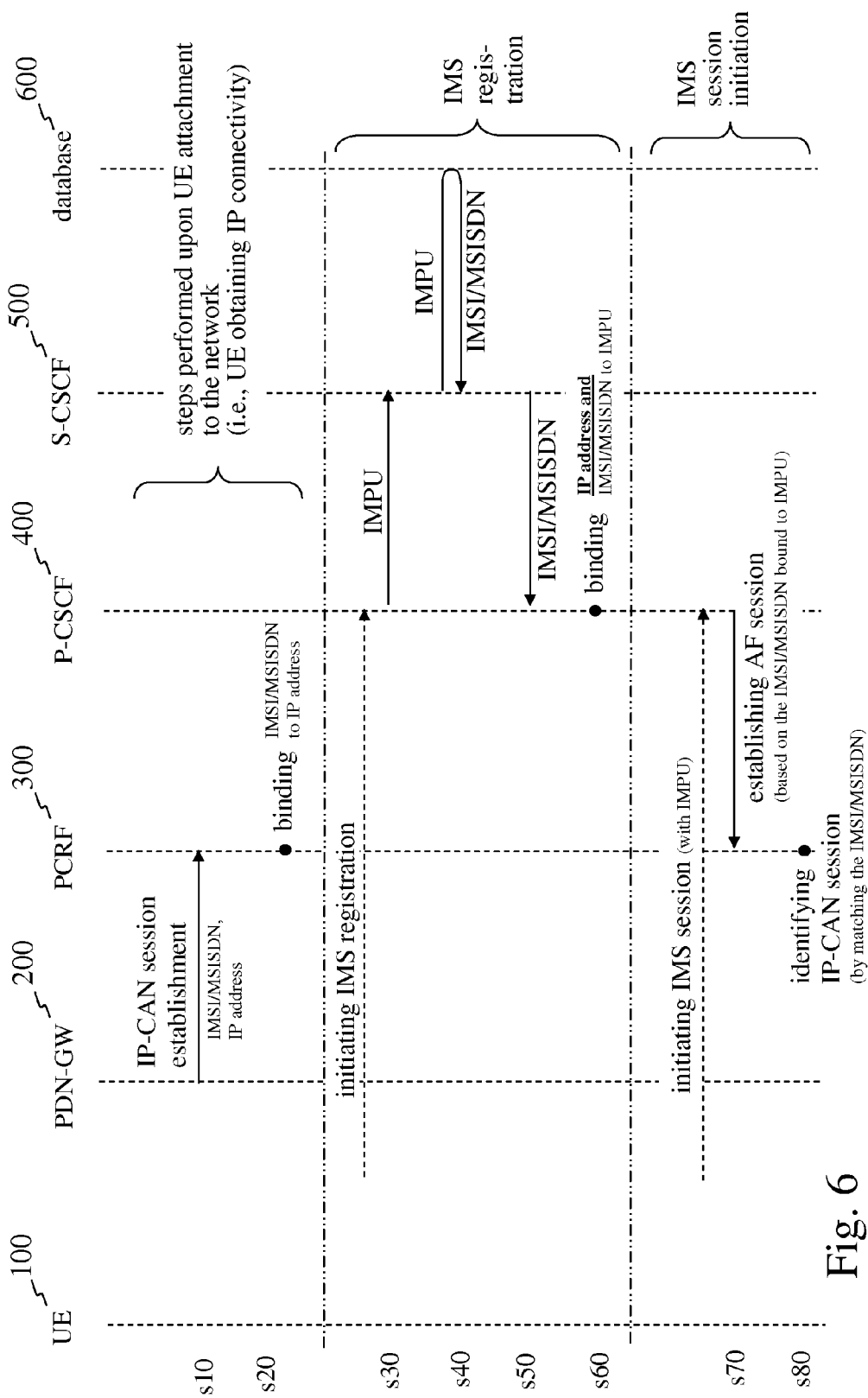
FIG. 6 is a message sequence chart illustrating a method in one embodiment of the invention, wherein the P-CSCF binds the IP address assigned to the UE and the subscription identifier of the UE to the IMPU.

FIG. 6 is a message sequence chart illustrating a method in one embodiment of the invention, which differs from the method illustrated in FIG. 1 in that, in step s60, P-CSCF 400 binds the IP address and the IMSI and/or MSISDN to the IMPU after receiving the IMSI and/or MSISDN from S-CSCF 500 in step s50.

Figure 7:
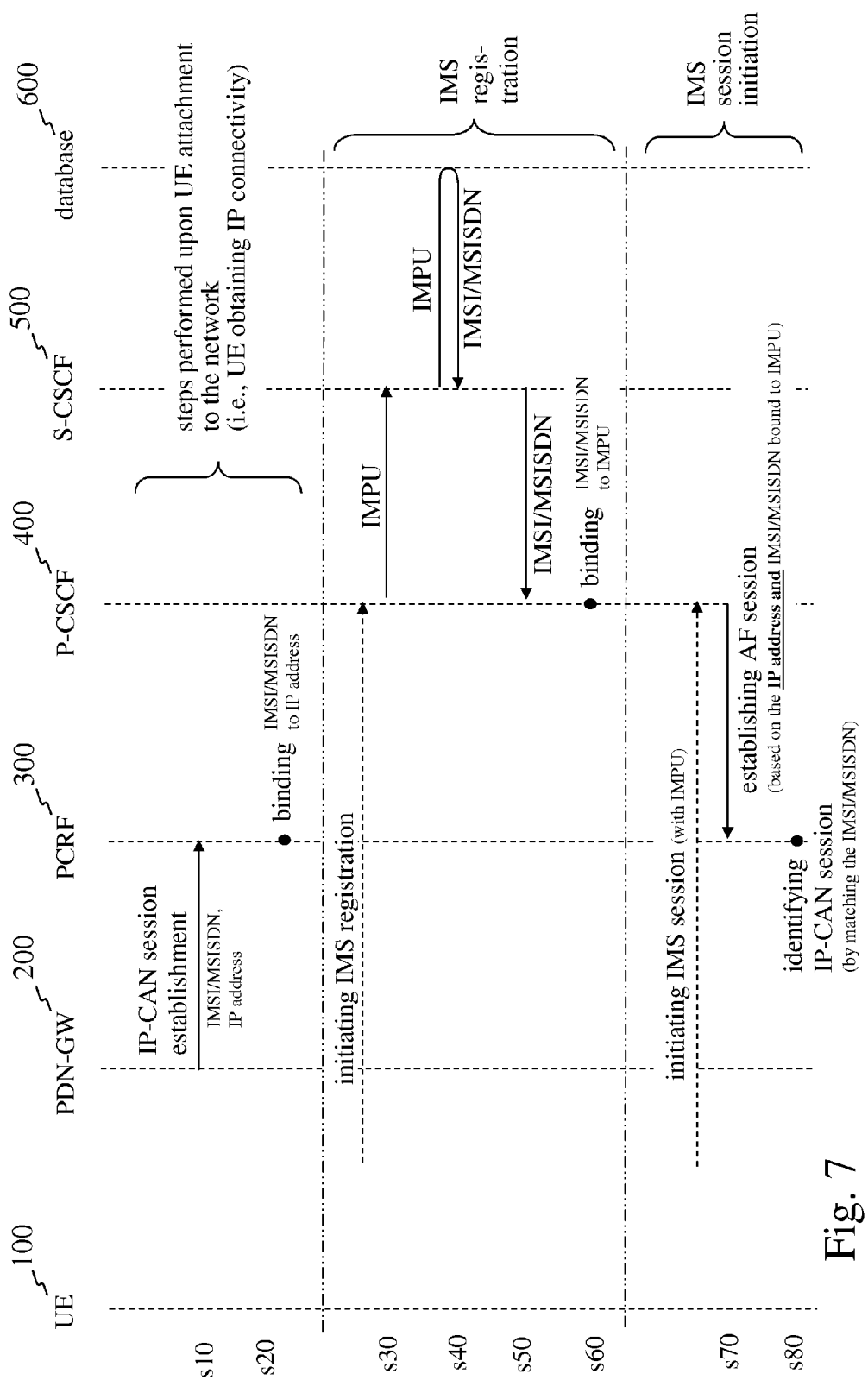
FIG. 7 is a message sequence chart illustrating a method in one embodiment of the invention, wherein the P-CSCF transmits the IP address in addition to the subscription identifier for establishing an AF session with the PCRF.

FIG. 7 is a message sequence chart illustrating a method in one embodiment of the invention which differs from the method illustrated in FIG. 1 in that, upon IMS session initiation, P-CSCF 400 establishes, in step s70, an AF session with PCRF 300 based on the IP address and the IMSI and/or MSISDN bound to the IMPU. The IP address used by P-CSCF 400 may for instance have been received upon IMS registration in a step s25, as illustrated on FIG. 5.

Figure 8:
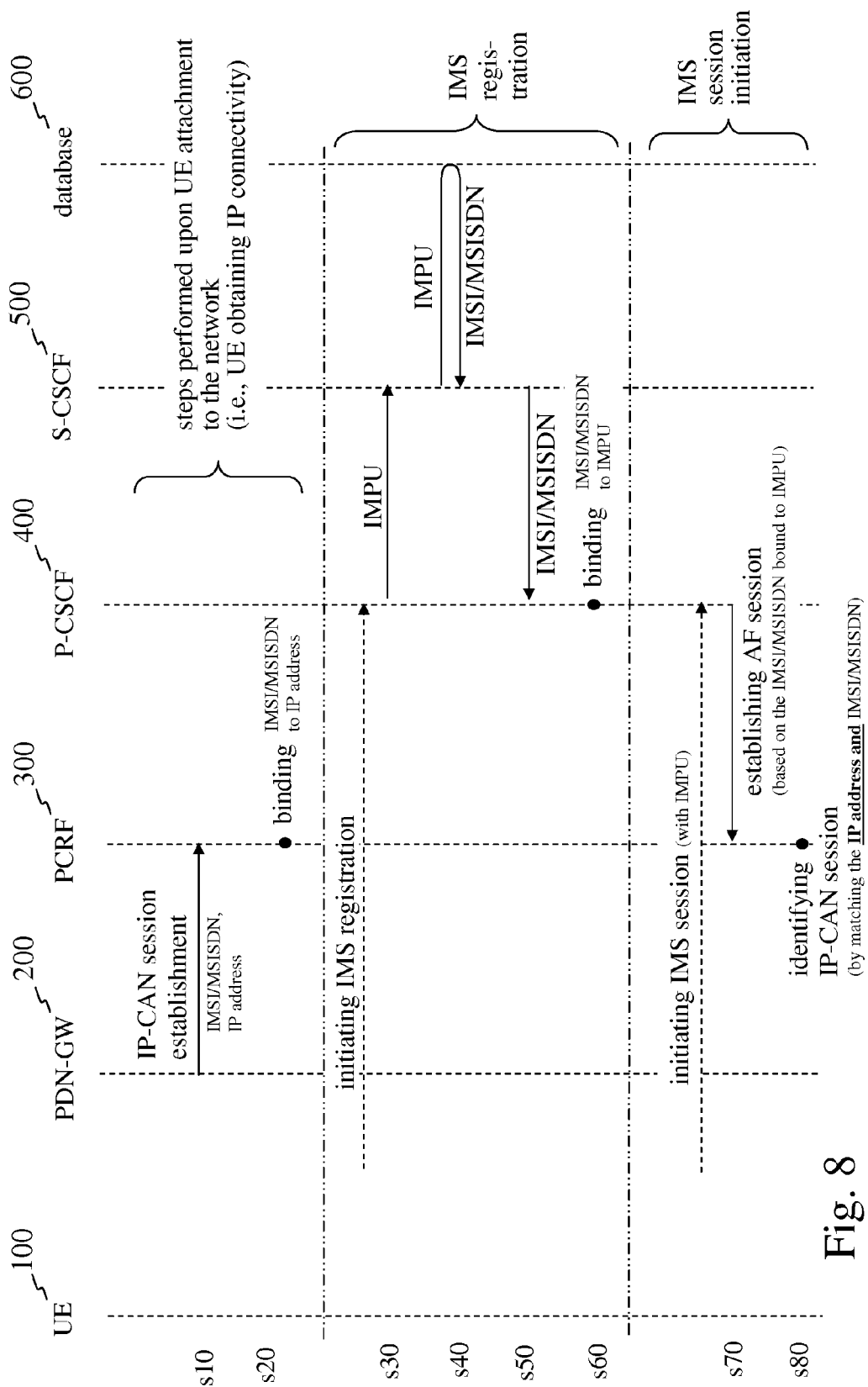
FIG. 8 is a message sequence chart illustrating a method in one embodiment of the invention, wherein the PCRF identifies the correct IP-CAN session by matching the subscription identifier and the IP address assigned to the UE.

FIG. 8 is a message sequence chart illustrating a method in one embodiment of the invention which differs from the method illustrated in FIG. 1 in that, in step s80, PCRF 300 identifies the correct IP-CAN session (to which rules have to be applied) based on the IP address and the IMSI and/or MSISDN of the IP-CAN session. This constitutes an efficient way to identify the correct IP-CAN session without ambiguity. The IP address used by PCRF 300 may for instance have been transmitted by P-CSCF 400 upon establishing the AF session in step s70 as illustrated on FIG. 7. In turn, P-CSCF 400 may have received the IP address upon IMS registration in a step s25, as illustrated on FIG. 5.

Now, to further understand the advantages of the invention, the context in which some embodiments of the invention have been developed and may be put into practice will be explained in more detail, followed by the description of further embodiments.

As explained above, a PCRF (such as for instance Ericsson's "Service-Aware Policy Controller", or SAPC) is a functional entity in charge of deciding charging, policies and QoS for a given user. For services such as MMTel (which stands for "3GPP/NGN IP Multimedia Subsystem (IMS) multimedia telephony service") and VoLTE (Voice over LTE, with LTE standing for "Long Term Evolution"), the PCRF may decide the quality of the media to be allocated for voice, video, instant messaging, picture sharing, white board, etc., which results, for example, on the establishment of dedicated bearer(s) with GBR or non-GBR. The PCRF may also make decisions about packet forwarding treatment in the RAN by means of determining the QCI.

The PCRF may also decide at the packet core control plane if the bearer to be established and maintained has priority over other bearers for the same of different users, providing the allocation and retention priority (ARP) information, which contains a level of priority (i.e. how important is the bearer compared to other bearers) and a pre-emption capability and vulnerability (i.e. if a bearer with lower priority is allowed to be torn down in favour of a bearer with higher priority).

All the information determined by the PCRF after policies evaluation may be installed in the PCEF, so that the service receives a specific treatment such as QoS and tuples for packet flows allowed or not allowed (i.e., action, protocol, direction, source, destination).

When an AF (such as for instance a P-CSCF for MMTeI, SBG for VoIP, with SBG standing for "session border gateway") detects that a user initiates a request or has received a request (e.g. a voice call), the AF may interact with the PCRF to provide service information (e.g. MMTeI service) and service data flows (SDFs). This leads to the installation of the SDFs and the decided QoS information (ARP/QCI) in the PCEF. The PCEF may checks if an existing bearer can be used for the SDFs (that is, a bearer already exists with the same ARP/QCI value) or if a new bearer is to be established. If a new bearer is to be established, the value of the ARP reflects how important is this bearer in relation to other bearers at the packet core network (IP CAN bearers) and RAN network (Radio Access Bearer, or RAB).

The user IP address is provided by the Packet Data Network connection (PDN-id/APN) at IP session establishment (where APN stands for "access point name" and characterizes a type of network connection that may be requested by a user). Hence, the IP address for a given user should be unique at least within the PDN-id. Therefore, the PCRF is in charge of identifying the IP session (which provides IP connectivity for the subscriber) associated to, for example, an audio call, to ensure the quality of the service for the voice media by installing the SDFs with the proper QCI for audio. That is, when the user acquired an IP address to be able to initiate/receive VoIP calls and later initiates a call, the PCRF must provide the guaranteed bit rate for audio media to be placed in a dedicated bearer within the user's IP session. This is usually done by the PCRF by matching the IP address acquired by the user with the source IP address used to establish the call (session binding), as described in "3*GPP TS 29.213 V*10.4.0 (2011-12); *Technical Specification Group Core Network and Terminals; Policy and Charging Control signalling flows and Quality of Service (QoS) parameter mapping (Release* 10)" (which provides IMS flows and interactions with PCC), especially section 5.2, second paragraph: "When the PCRF accepts an AA-Request from the AF over the Rx interface with service information, the PCRF shall perform session binding and associate the described service IP flows within the AF session information (and therefore the applicable PCC rules) to an existing IP-CAN session. This association is done comparing the user IP address received via the Rx interface in either the Frame-IP-Address AVP or the Framed-IPv6-Prefix AVP with the IPv4 address or IPv6 prefix received via the Gx interface. The UE Identity if present in the Subscription-Id AVP and the PDN information if available in the Called-Station-ID AVP may also assist on this association."

Let us now discuss some of the problems addressed by embodiments of the invention, for further understanding the context in which some embodiments of the invention have been developed.

Due to some operator's network topologies, there are deployments which require two PDN-id/APN to have the same IP address range to be used (e.g. Virtual Private Networks). These deployments result in two different users acquiring the same IP address. Even within the same PDN-id, the same IP address might be owned by more than one user at the same time. This may occur when two different PDN-GWs assign the same IP address for a given PDN-id and they are requesting the same PCRF for QoS rules (e.g. multi-tenancy scenarios using a single policy server for several PLMNs, with "PLMN" standing for "public land mobile network").

Since the PCRF will identify the IP session bound to the user based on the IP address received from the AF (e.g. P-CSCF for VoIP calls), for these scenarios there is no way for the PCRF to know which is the IP session to carry the audio media. That is also the case for the P-CSCF, since it is not aware of the user identity; hence it is unable to provide it to the PCRF. This is shown in FIGS. 9*a*-9*b*, where two users accessing different PDN connections (i.e. using different PDN-id/APN) acquire the same IP address.

Figure 9A:
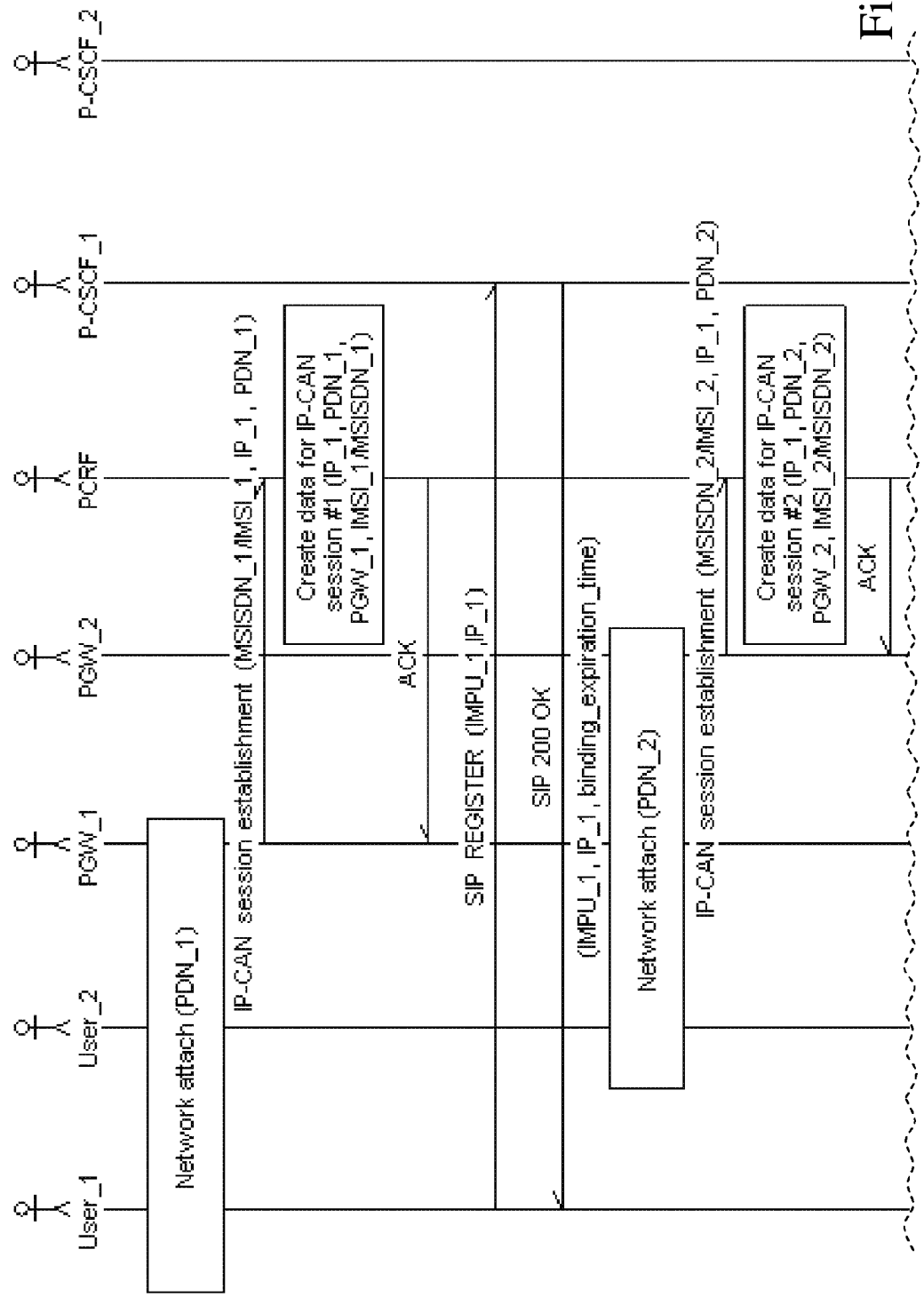
FIGS. 9a and 9b, which should be read together, form a message sequence chart for illustrating some of the problems that some embodiments of the invention address.
Figure 9B:
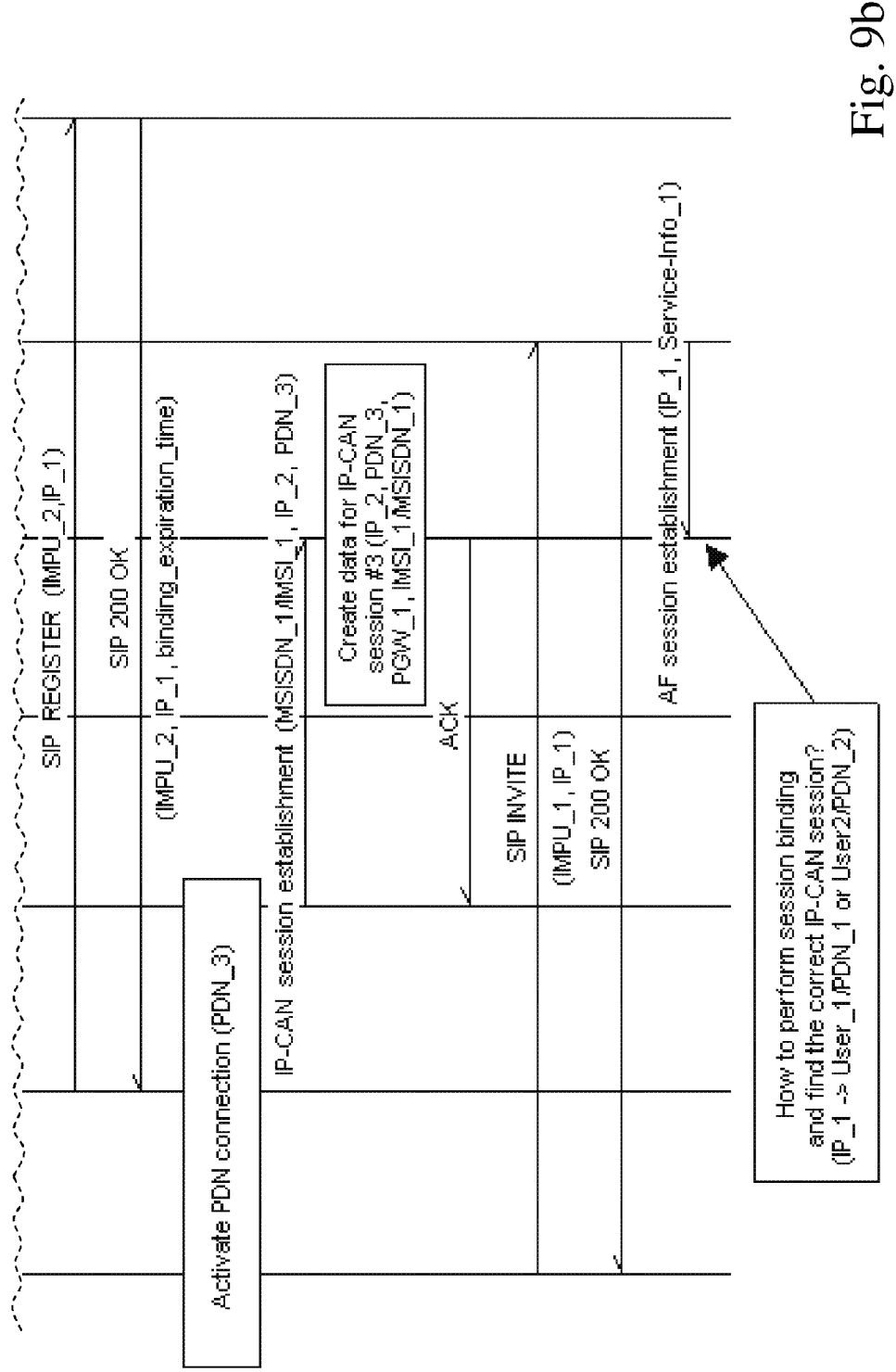

As shown on FIGS. 9*a*-9*b* (wherein the steps illustrated on FIG. 9*b* follow those illustrated on FIG. 9*a*), when User_1 and User_2 are provided with the same IP address, the PCRF is unable to bind the AF session with the correct IP session. The following remarks may be made on the scenario illustrated on FIGS. 9*a*-9*b*.

First, it may be noted that, when User 1 activates a second PDN connection PDN_3 with PCEF/PGW_1, User_1 obtains a second IP address IP_2 which is different from IP_1. The IP address is provided per user/APN. That is, the PDN-GW internal pool contains a range of IP addresses to be allocated, and this pool is per APN. The user may have two IP addresses, one for each data network.

Secondly, it may also be noted that, there are two PDN gateways (with PCEFs), i.e. PGW_1 and PGW_2. There can be more than one PCEF associated with a single PCRF. In other words, there may be several clients/PCEFs per server/PCRF. The PDN-GW is usually selected based on the APN, whereas the PCRF can be selected also per user. If there is a single PCRF in an operators network, there is no selection policy at the PCEF.

Thirdly, further information on the scenario illustrated on FIGS. 9*a*-9*b* may for example be found, (i) regarding the IMS registration and call establishment, in 3GPP TS 29.213, already mentioned above (see notably sections B.1 and B.2 of TS 29.213), and (ii) regarding the Cx interface between the S-CSCF and the HSS, in "3*GPP TS 29.228 V*10.4.0 (2011-12); *Technical Specification Group Core Network and Terminals; IP Multimedia (IM) Subsystem Cx and Dx interfaces; Signalling flows and message contents (Release* 10)" (see notably section A.4).

In view of these problems, embodiments of the invention encompass a solution to provide the necessary information to P-CSCF so that the binding is correctly performed. This enables the PCRF to correctly operate in scenarios described previously in which the policy server (PCRF) has to deal with UEs having been assigned the same IP addresses simultaneously.

The principle of some embodiments of the invention is to pass through the involved IMS nodes the information required (IMSI and/or MSISDN) from the HSS on to the P-CSCF. Although a possibility exists, in existing IMS architectures, for the S-CSCF to know the IMSI (intended for legal interception of voice calls), no consideration is given for the other identifiers to be sent over the Cx interface (see for instance: (i) 3GPP TS 29.228 (already mentioned above), especially section A.4.1 and Table 6.1.2.2, which lists the data provided by HSS to S-CSCF, and (ii) "3*GPP TSG CT WG*4 *Meeting* #55, *Change request C*4-113023, *Providing the IMSI to the S-CSCF*; San Francisco, US; 14-18 Nov. 2011, Date: Mar. 11, 2011").

Moreover, there is no existing mechanism to provide this information to the P-CSCF over the Mw interface, resulting in a lack of information for the PCRF (see for instance "3*GPP TS* 24.229 *V*10.6.0 (2011-12), *Technical Specification Group Core Network and Terminals; IP multimedia call control protocol based on Session Initiation Protocol (SIP) and Session Description Protocol (SDP); Stage* 3 (*Release* 10)", especially section 7.10, which lists the information transported from S-CSCF to P-CSCF, lacking the IMSI/MSISDN). In other words, currently, there is no possibility to send IMSI/MSISDN for the P-CSCF. At the protocol level, the parameter over the Rx interface, between AF and PCRF, exists. However, at the procedure level, the P-CSCF does not receive such information from the S-CSCF in accordance with prior art IMS procedures.

Figure 12A:
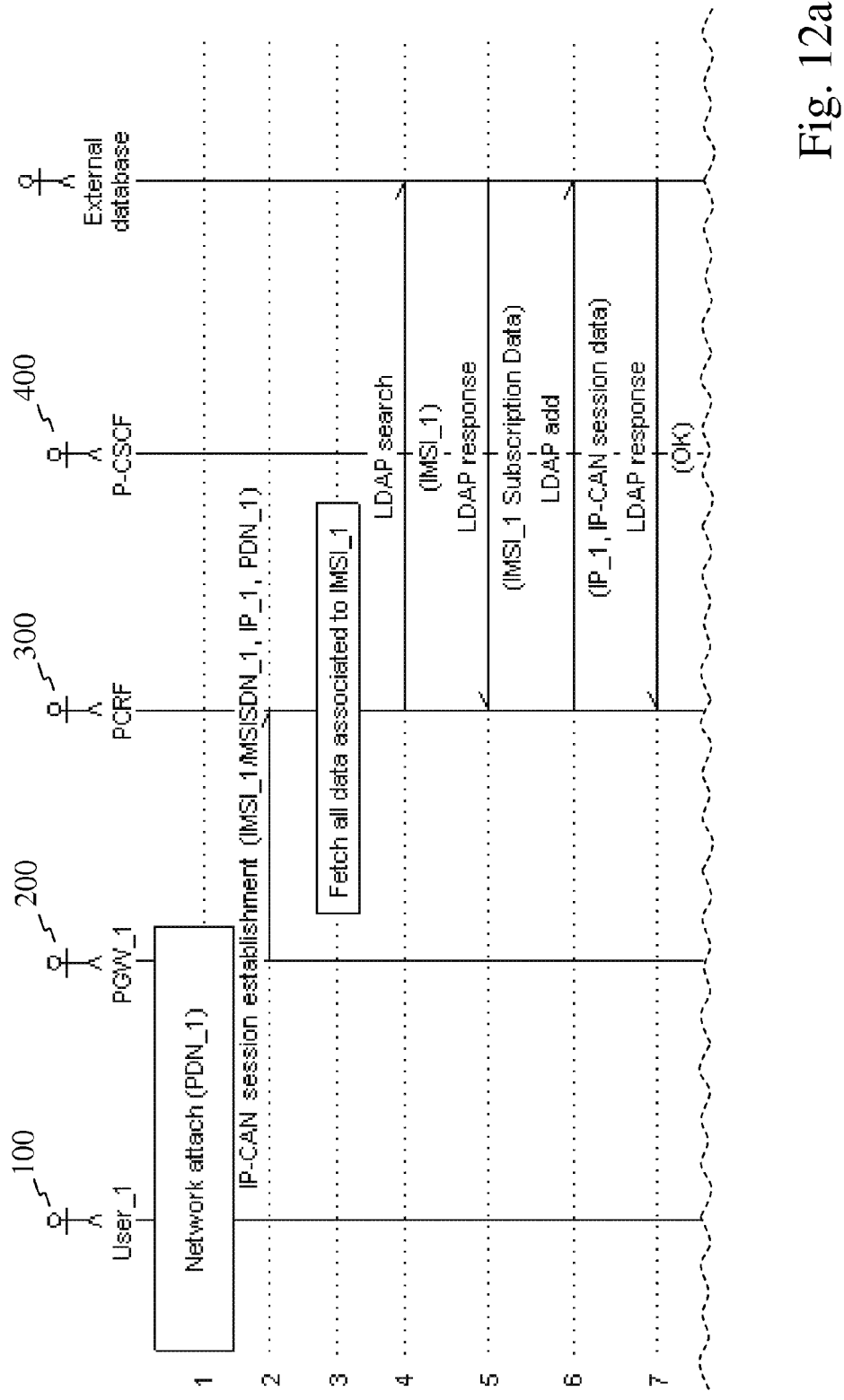
FIGS. 12a and 12b, which should be read together, form a message sequence chart illustrating a method in one embodiment of the invention, in a case of a stateless PCRF front end.
Figure 12B:
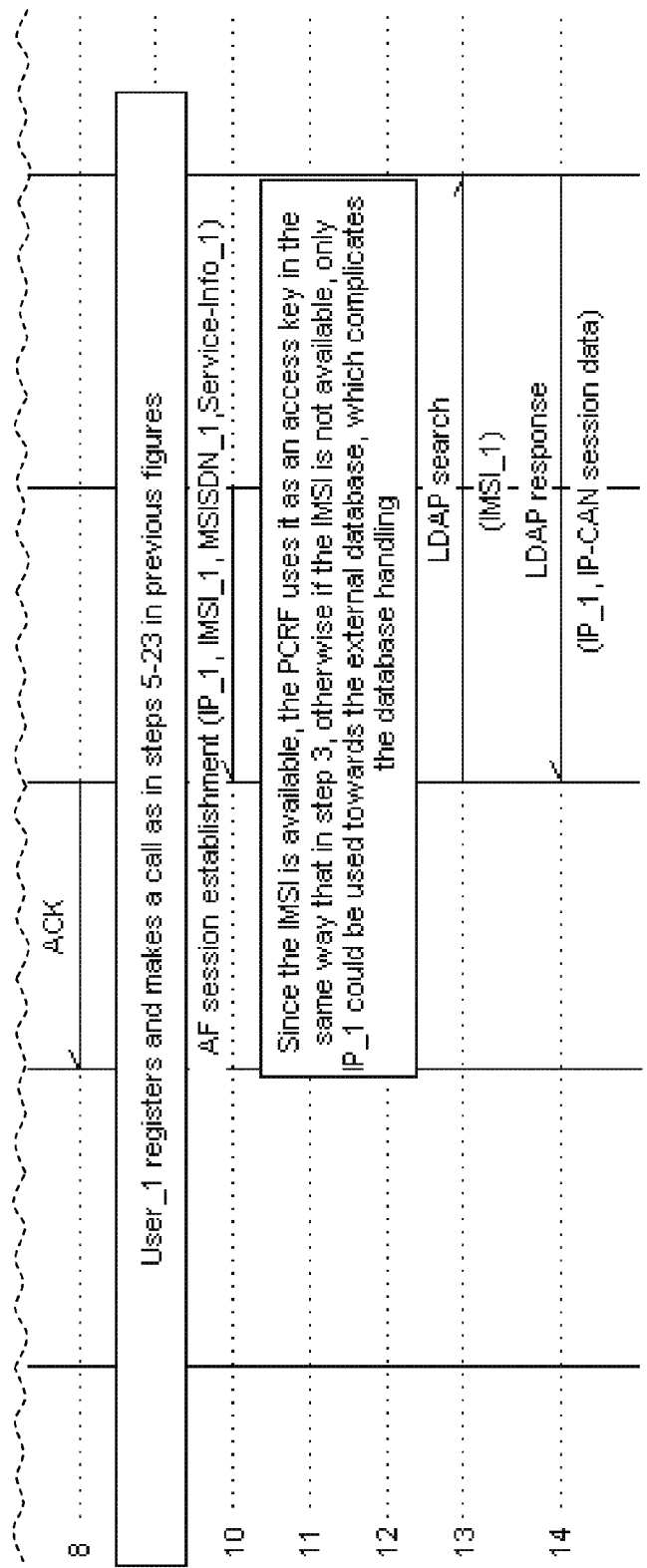

Some embodiments of the invention also enable to access the user data stored in an external database (that is, when the PCRF acts as a front end (FE) according to "3*GPP TS* 23.335 V10.0.0 (2011-03), *Technical Specification Group Core Network and Terminals; User Data Convergence (UDC); Technical realization and information flows; Stage* 2 (*Release* 10)") using always a subscription identifier, instead of the IP address, since it will be available when the P-CSCF establishes a session towards the PCRF. Such embodiment will be described with reference to FIGS. 12*a* and 12*b*.

Figure 10A:
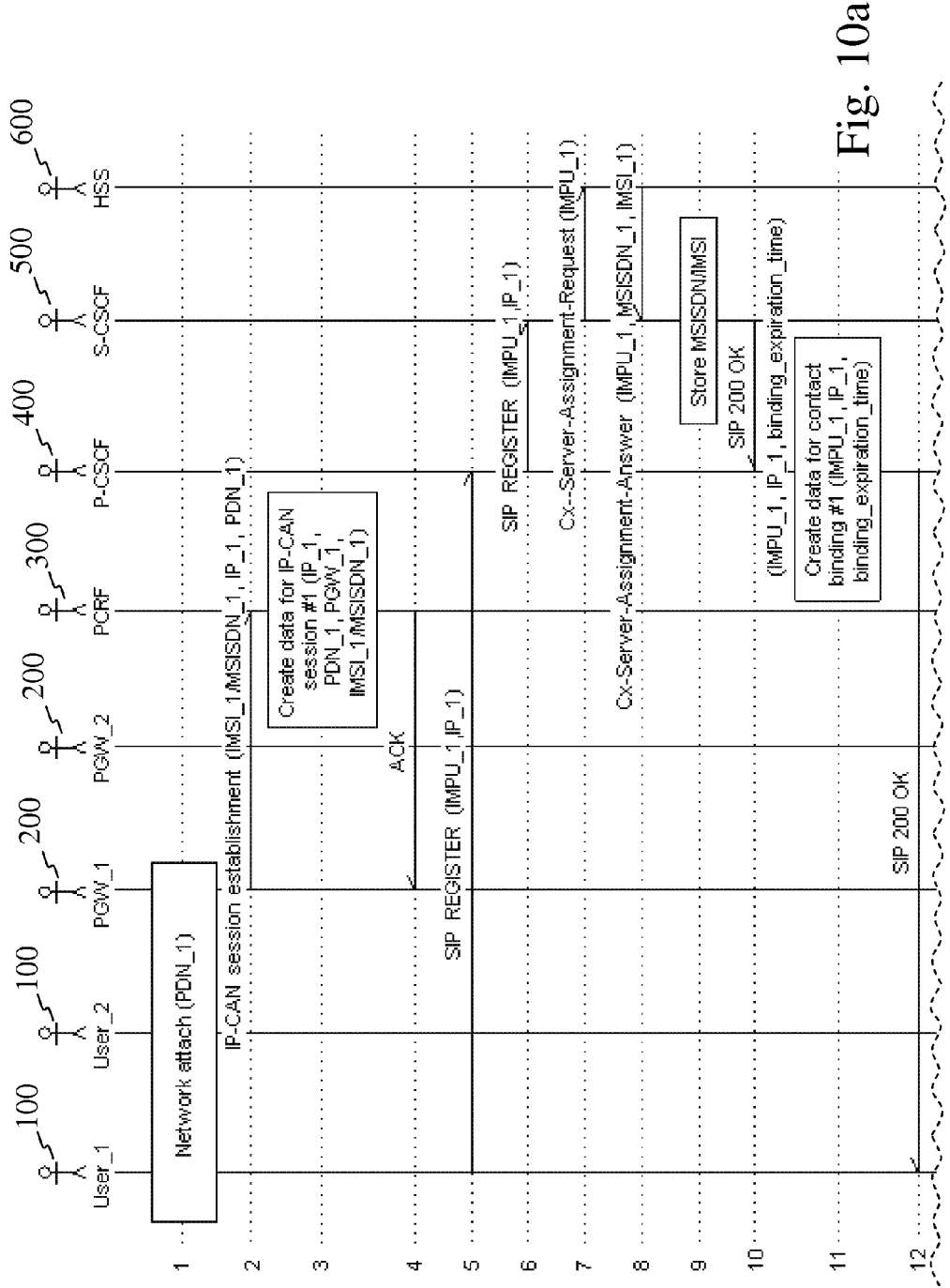

FIGS. 10*a*-10*b*, which should be read together, schematically illustrates a procedure when no Implicit Registration Set exists, in one embodiment of the invention. An implicit registration is for example explained in "3*GPP TS* 23.228 V10.7.0 (2011-12); *Technical Specification Group Services and System Aspects; IP Multimedia Subsystem (IMS); Stage* 2 (*Release* 10)", clause 5.2.1 a: "When an user has a set of Public User Identities defined to be implicitly registered via single IMS registration of one of the Public User Identity's in that set, it is considered to be an Implicit Registration". The steps illustrated in FIGS. 10*a*-10*b* may be described as follows:

(Step 1). User 1 attaches the network (as illustrated by the box labelled "Network Attach (PDN_1)" on FIG. 10*a*). IP address 1 (i.e., IP_1) is provided by the PDN-GW (i.e., PGW_1). In other words, the PDN-GW assigns an IP address to the UE from the address space of the PDN. IP connectivity is therefore provided to the UE.

(Step 2). PDN-GW_1 (i.e., PGW_1), which may include a PCEF, performs IP-CAN session establishment towards the PCRF, providing the subscription identity and the IP address assigned (as illustrated by the arrow labelled "IP-CAN session establishment (IMSI_1/MSISDN_, IP_1, PDN_1)" on FIG. 10*a*). This step is an exemplary step consisting in establishing an IP-CAN session as described notably with reference to step s10 in FIG. 1.

(Step 3). The PCRF creates session data and identifies uniquely the session with IP address, subscription identity (MSISDN/IMSI), PDN identifier and PCEF (PGW_1) (as illustrated by the box labelled "Create data for IP-CAN session #1 (IP_1, PDN_1, PGW_1, IMSI_1/MSISDN_1)" on FIG. 10*a*). This step is an exemplary step consisting in binding as described notably with reference to step s20 in FIG. 1.

(Step 4). IP-CAN session establishment is accepted by the PCRF (as illustrated by the arrow labelled "ACK" on FIG. 10*a*). An entry is created in the PCRF to identify the Gx session with the following data: IP address, APN, PGW address, IMSI.

(Step 5). User_1 initiates an IMS registration using his/her IMPU towards the P-CSCF (as illustrated by the arrow labelled "SIP REGISTER (IMPU_1, IP_1)" on FIG. 10*a*). This step is an exemplary step consisting in receiving an IP address and IMPU as described with reference to step 25 in FIG. 5.

(Step 6). The P-CSCF proxies the registration towards the S-CSCF (as illustrated by the second arrow labelled "SIP REGISTER (IMPU_1, IP_1)" on FIG. 10*a*). This step is an example of step s30 as notably described with reference to FIG. 1.

(Step 7). The S-CSCF fetches the user profile from HSS. This includes all associated IMS public identities and the IMSI (as illustrated by the arrow labelled "Cx-Server-Assignment-Request (IMPU_1)" on FIG. 10*a*).

(Step 8). The IMSI and MSISDN are provided by the HSS (as illustrated by the arrow labelled "Cx-Server-Assignment-Answer (IMPU_1, MSISDN_1, IMSI_1)" on FIG. 10*a*). Steps 7 and 8 constitute an example of step s40 as described with reference to FIG. 1.

(Step 9). The S-CSCF stores the information received. This includes the additional subscription information (MSISDN) (as illustrated by the box labelled "Store MSISDN/IMSI" on FIG. 10*a*). This step is an exemplary step consisting in storing the IMSI and/or MSISDN as described notably with reference to step s45 in FIG. 4.

(Step 10). Once the user is authenticated successfully, the S-CSCF accepts the registration (as illustrated by the arrow labelled "SIP 200 OK (IMPU_1, IP_1, binding_expiration_time)" on FIG. 10*a*).

(Step 11). The P-CSCF creates the contact binding with the identity received from the S-CSCF (as illustrated by the box labelled "Create data for contact binding #1 (IMPU_1, IP_1, binding_expiration_time)" on FIG. 10*a*).

(Step 12). The P-CSCF forwards the response to the user (as illustrated by the arrow labelled "SIP 200 OK" on FIG. 10*a*).

(Step 13). The P-CSCF subscribes to the registration event, as per "J. Rosenberg, *RFC* 3680, *A Session Initiation Protocol (SIP) Event Package for Registrations, The Internet Society, Network Working Group,* March 2004" and 3GPP TS 24.229 (already mentioned above). This allows the P-CSCF to be notified whenever the user status is changed (e.g. operator initiated de-registration). This is illustrated by the arrow labelled "SIP SUBSCRIBE (IMPU_1, event:reg)" on FIG. 10*b*.

(Step 14). The S-CSCF accepts the subscription (as illustrated by the arrow labelled "SIP 200 OK" on FIG. 10*b*).

(Step 15). The S-CSCF notifies about the current user status (as illustrated by the arrow labelled "SIP NOTIFY (IMPU_1, MSISDN_1, IMSI_1)" on FIG. 10*b*). This notification will also be used to convey the subscription identities (MSISDN/IMSI) in an XML body (see 3GPP TS 24.229, already mentioned above). This step is an example of step s50 as described notably with reference to FIG. 1.

(Step 16). The P-CSCF updates the contact binding created previously storing the received identities (MSISDN, IMSI) together with the registration event information (as illustrated by the box labelled "Update data for contact binding (IMPU_1, MSISDN_1/IMSI_1, IP_1, binding_expiration_time)" on FIG. 10*b*). At this point, the P-CSCF contact binding contains IP_1, IMPU_1, MSISDN_1/IMSI_1 and binding expiration. This step is an example of step s60 as described notably with reference to FIG. 1.

(Step 17). The P-CSCF accepts the notification (as illustrated by the arrow labelled "SIP 200 OK" on FIG. 10*b*).

(Step 18). User_2 attaches the network (as illustrated by the box labelled "Network Attach (PDN_2)" on FIG. 10*b*). The same IP address is assigned by PDN-GW 2 (i.e., PGW_2).

(Step 19). PDN-GW 2 (i.e., PGW_2) performs IP-CAN session establishment towards the PCRF, providing the subscription identity and the IP address assigned (as illustrated by the arrow labelled "IP-CAN session establishment (IMSI_2/MSISDN_2, IP_1, PDN_2)" on FIG. 10*b*).

(Step 20). The PCRF creates session data and identifies uniquely the session with IP address, subscription identity (MSISDN/IMSI), PDN identifier and PCEF (i.e., PGW_2). This is illustrated by the box labelled "Create data for IP-CAN session #2 (IP_1, PDN_2, PGW_2, IMSI_2/MSISDN_2)" on FIG. 10*b*.

(Step 21). IP-CAN session establishment is accepted by the PCRF (as illustrated by the arrow labelled "ACK" on FIG. 10b).

(Step 22). User 1 initiates a SIP request (as illustrated by the arrow labelled "SIP INVITE (IMPU_1, IP_1)" on FIG. 10b). It is noted that a "SDP offer" may replace the "SIP INVITE" and an "SDP answer" may replace the "SIP 200 OK" (wherein SDP stands for Session Description Protocol; for more information, see for example "M. Handley et al, *RFC* 4566, *SDP: Session Description Protocol, The Internet Society, Network Working Group, July* 2006"). SDP or other protocols may be used instead of SIP in any embodiments of the invention.

(Step 23). The P-CSCF identifies the IMPU and the source IP address of the SIP request and fetches the corresponding subscription identifier (as illustrated by the box labelled "Fetch data associated to IMPU_1/IP_1 (IMSI_1/MSISDN_1)" on FIG. 10b). Both IMSI and MSISDN are included in the AF session establishment.

(Step 24). When received, the PCRF uses these identities together with the IP address to find the associated IP-CAN session (as illustrated by the arrow labelled "AF session establishment (IP_1, IMSI_1, MSISDN_1, Service-Info_1)" at the bottom of FIG. 10b). Binding is performed correctly (as illustrated by the box labelled "Session is bound to the correct IP-CAN session #1 (IP_1, MSISDN_1, IMSI_1, PDN_1, PGW_1)" on FIG. 10b). Steps s23 and 24 constitute examples of steps s70 and s80 as described notably with reference to FIG. 1.

Among the steps listed above, steps 8, 9, 15, 16, 23, and 24 contribute in particular, together with the other steps, to addressing the technical problems discussed above.

Figure 11A:
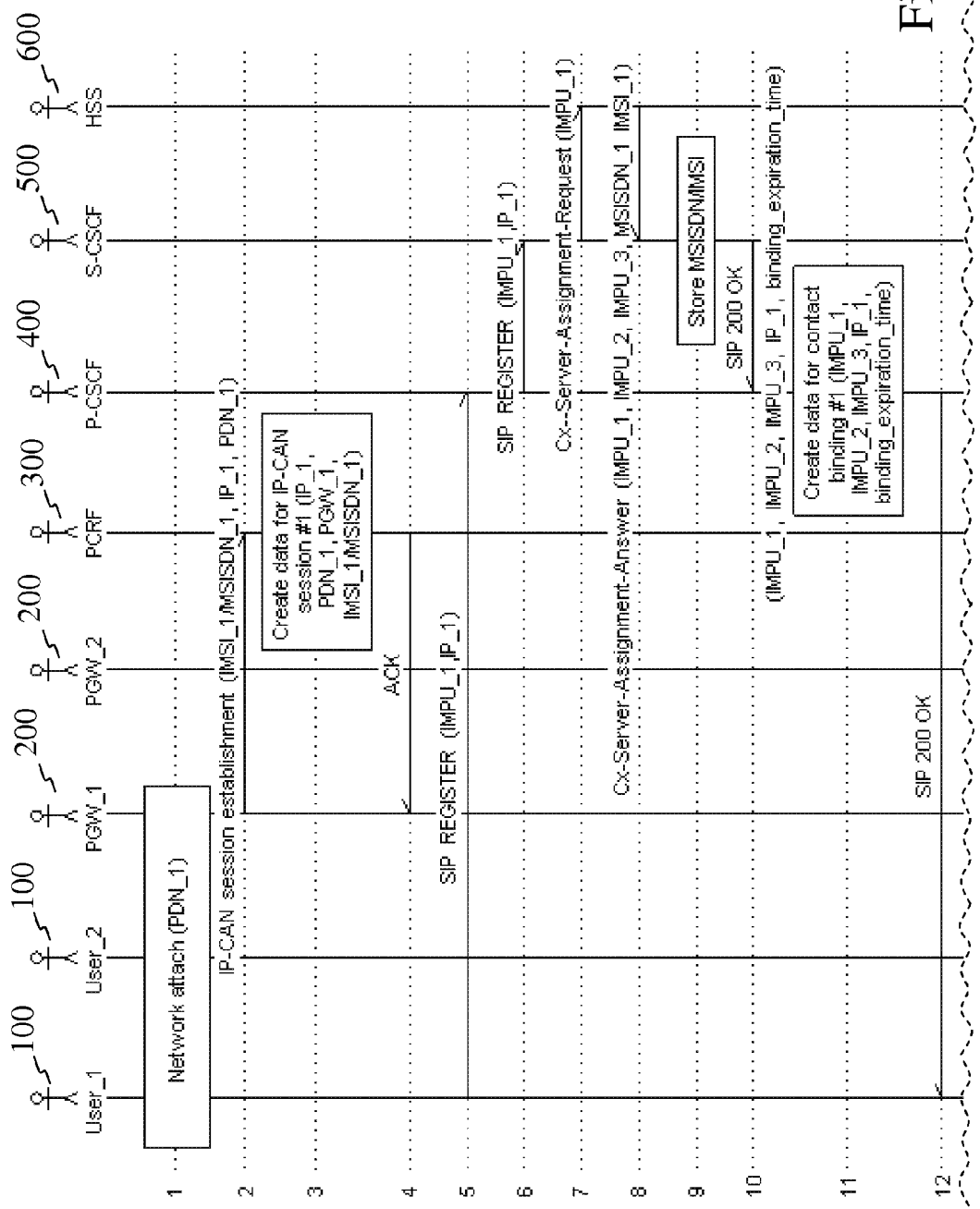
FIGS. 11a and 11b, which should be read together, form a message sequence chart illustrating a method in one embodiment of the invention, when an implicit registration set exists.
Figure 11B:
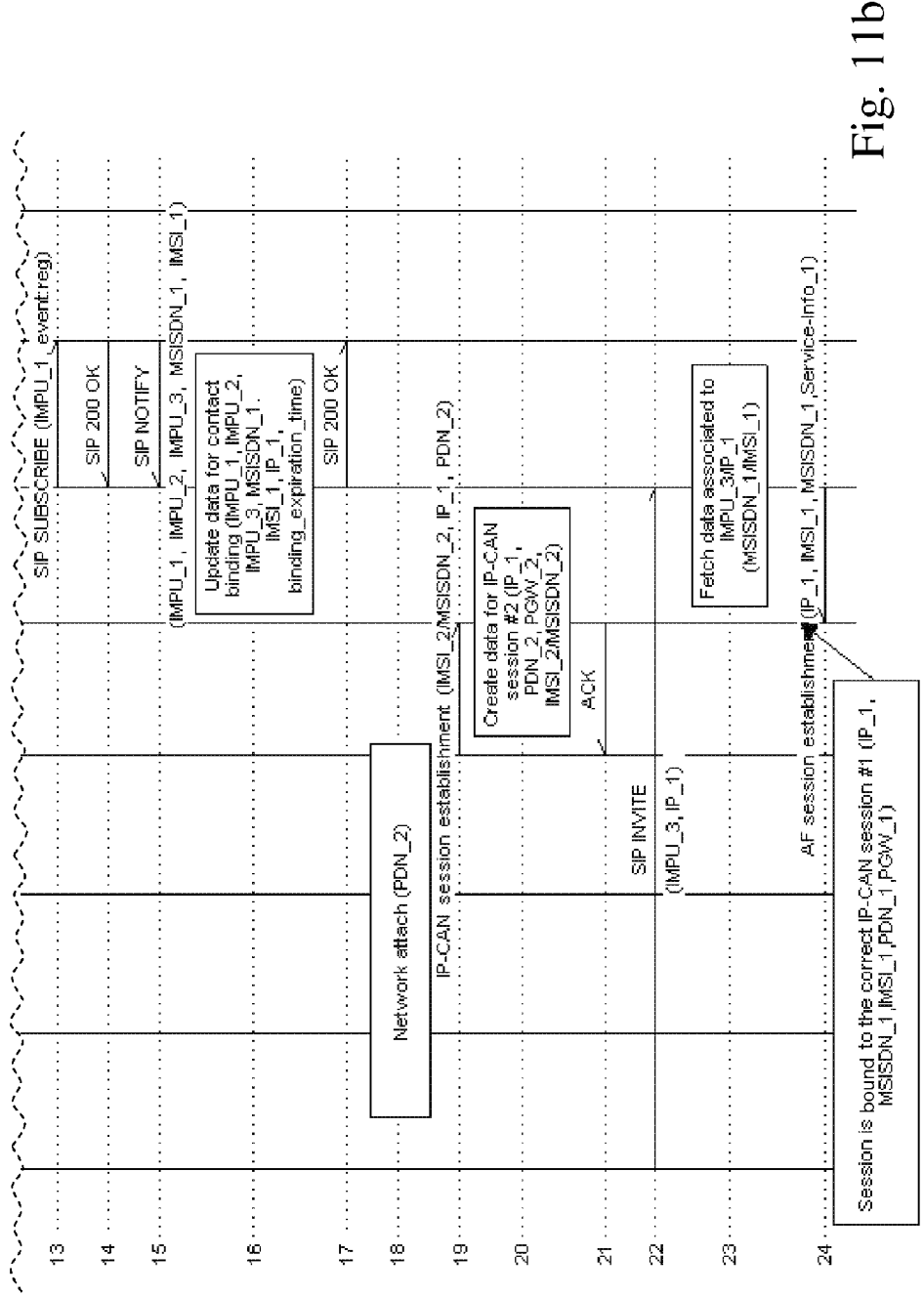

FIGS. 11a-11b schematically illustrates a procedure when an Implicit Registration Set exists, in one embodiment of the invention. The steps which substantially differ from the steps illustrated on FIGS. 10a-10b may be described as follows:

(Step 8). The HSS provides the list of IMPUs belonging to the same implicit registration set (IRS) associated to the one being explicitly registered (IMPU_1) (as illustrated by the arrow labelled "Cx-Server-Assignment-Answer (IMPU_1, IMPU_2, IMPU_3, MSISDN_1, IMSI_1)" on FIG. 11a).

(Step 11). The P-CSCF creates the contact binding with the identities received from S-CSCF (as illustrated by the box labelled "Create data for contact binding #1 (IMPU_1, IMPU_2, IMPU_3, IP_1, binding_expiration_time)" on FIG. 11a).

(Step 23). The P-CSCF identifies the IMS public identity (IMPU_3) and the source IP address of the SIP request and fetches the corresponding subscription identifier. Both IMSI and MSISDN are included in the AF session establishment (as illustrated by the box labelled "Fetch data associated to IMPU_3/IP_1 (IMSI_1/MSISDN_1)" on FIG. 11b).

Some advantages of embodiments of the invention are therefore as follows:

(1) Embodiments of the invention enable to handle additional operator's network scenarios (e.g. VPN, multi-tenancy) where the same IP addresses are allocated simultaneously to different IP-CAN sessions and are handled by the same PCRF.

(2) Not only the PCRF but also, in addition, a DRA can be deployed in the network scenario explained in previous bullet. DRA (Diameter Routing Agent) is described for example in 3GPP TS 29.213, already mentioned above, and is used to find the PCRF hosting the user data.

(3) In a User Data Consolidation scenario (see 3GPP TS 23.335 (already mentioned above), Annex B.10), embodiments of the invention enable the possibility of handling stateless PCRF front ends reducing complexity in the PCRF data model by removing the need of using the IP address as a key to access the subscriber data, in case static and dynamic (session related) PCRF subscriber data is stored in the User Data Repository. Such a scenario is schematically illustrated by the message sequence chart of FIGS. 12a-12b, in one embodiment of the invention.

Figure 13:
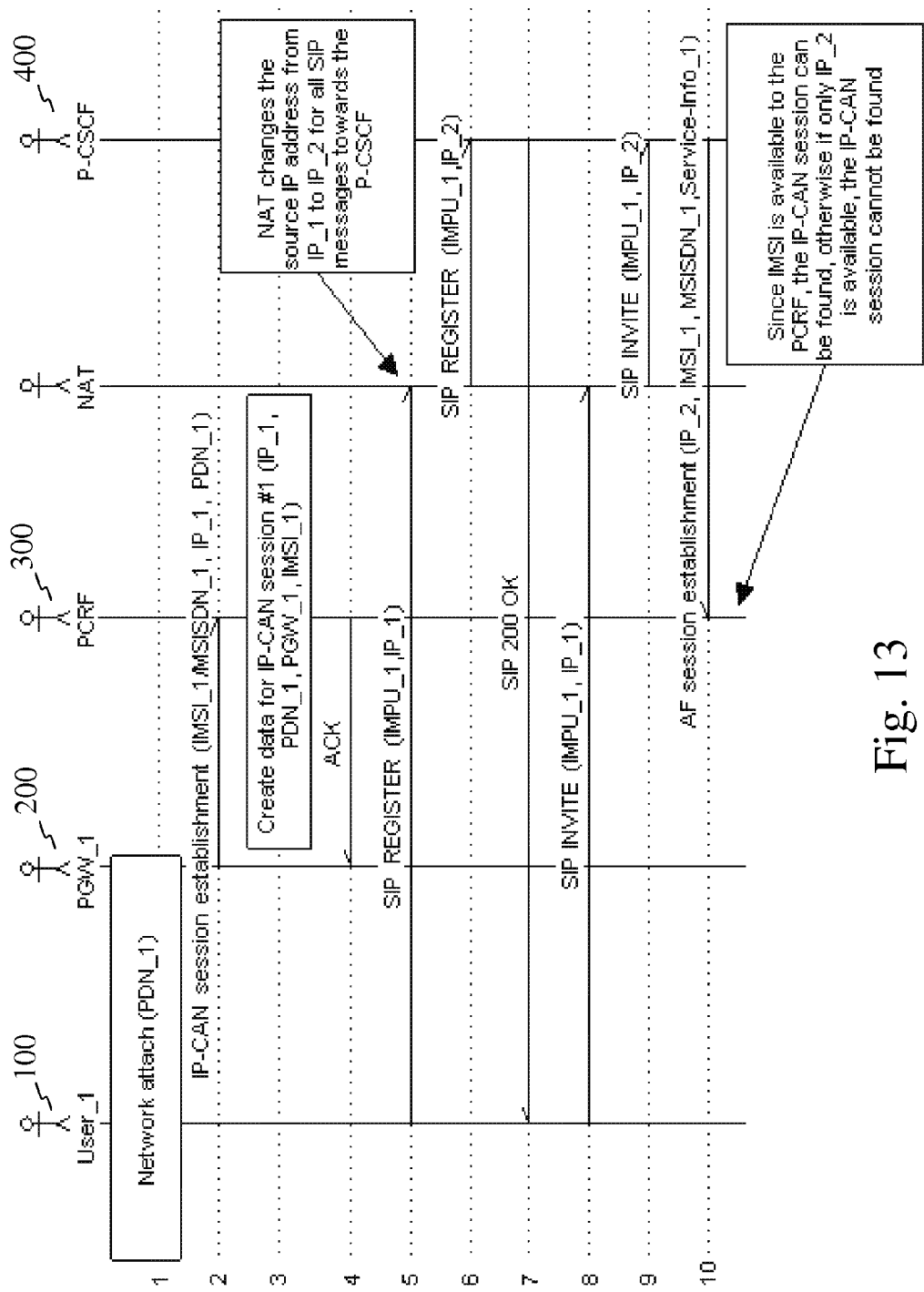
FIG. 13 is a message sequence chart illustrating a method in one embodiment of the invention where a network address translation (NAT) is used.

(4) Embodiments of the invention provide the possibility for FMC (Fixed Mobile Convergence) deployments where NAT (Network Address Translation) is used (meaning that IP address over Gx and Rx won't be the same) to use the subscription identity (IMSI) to provide QoS rules. Such a scenario is schematically illustrated by the message sequence chart of FIG. 13, in one embodiment of the invention.

Figure 14:
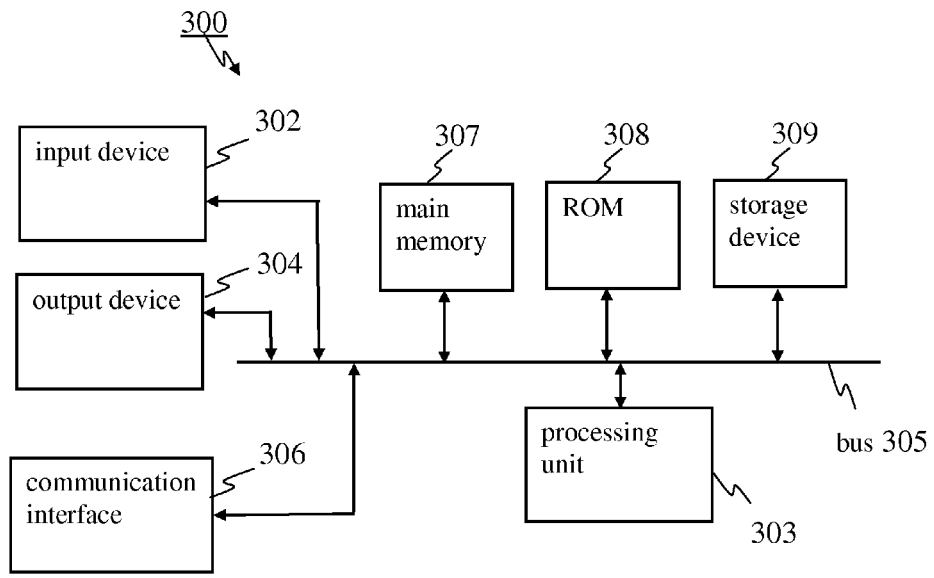
FIG. 14 is a schematic diagram of an exemplary implementation of a network node, which may host any one of a PCRF, a P-CSCF and a S-CSCF, in one embodiment of the invention.

FIG. 14 is a schematic diagram of an exemplary implementation of a network node including a PCRF 300 usable in embodiments of the invention. As illustrated, PCRF 300 may include a bus 305, a processing unit 303, a main memory 307, a ROM 308, a storage device 309, an input device 302, an output device 304, and a communication interface 306. Bus 305 may include a path that permits communication among the components the network node including PCRF 300.

Processing unit 303 may include a processor, a microprocessor, or processing logic that may interpret and execute instructions. Main memory 307 may include a RAM or another type of dynamic storage device that may store information and instructions for execution by processing unit 303. ROM 308 may include a ROM device or another type of static storage device that may store static information and instructions for use by processing unit 303. Storage device 309 may include a magnetic and/or optical recording medium and its corresponding drive.

Input device 302 may include a mechanism that permits an operator, or more generally a user, to input information to the network node including PCRF 300, such as a keypad, a keyboard, a mouse, a pen, voice recognition and/or biometric mechanisms, etc. Output device 304 may include a mechanism that outputs information to the operator, including a display, a printer, a speaker, etc. Communication interface 306 may include any transceiver-like mechanism that enables the network node including PCRF 300 to communicate with other devices and/or systems (such as with external applications). For example, communication interface 306 may include mechanisms for communicating with another device or system via a network.

The network node including PCRF 300 may perform certain operations or processes described herein. The network node including PCRF 300 may perform these operations in response to processing unit 303 executing software instructions contained in a computer-readable medium, such as main memory 307, ROM 308, and/or storage device 309. A computer-readable medium may be defined as a physical or a logical memory device. For example, a logical memory device may include memory space within a single physical memory device or distributed across multiple physical memory devices. Each of main memory 307, ROM 308 and storage device 309 may include computer-readable media. The magnetic and/or optical recording media (e.g., readable CDs or DVDs) of storage device 309 may also include computer-readable media. The software instructions may be read into main memory 307 from another computer-readable medium, such as storage device 309, or from another device via communication interface 306.

The software instructions contained in main memory 309 may cause processing unit 303 to perform operations or processes described herein. Alternatively, hardwired circuitry may be used in place of or in combination with software instructions to implement processes and/or operations described herein. Thus, implementations described herein are not limited to any specific combination of hardware and software.

Figure 15:
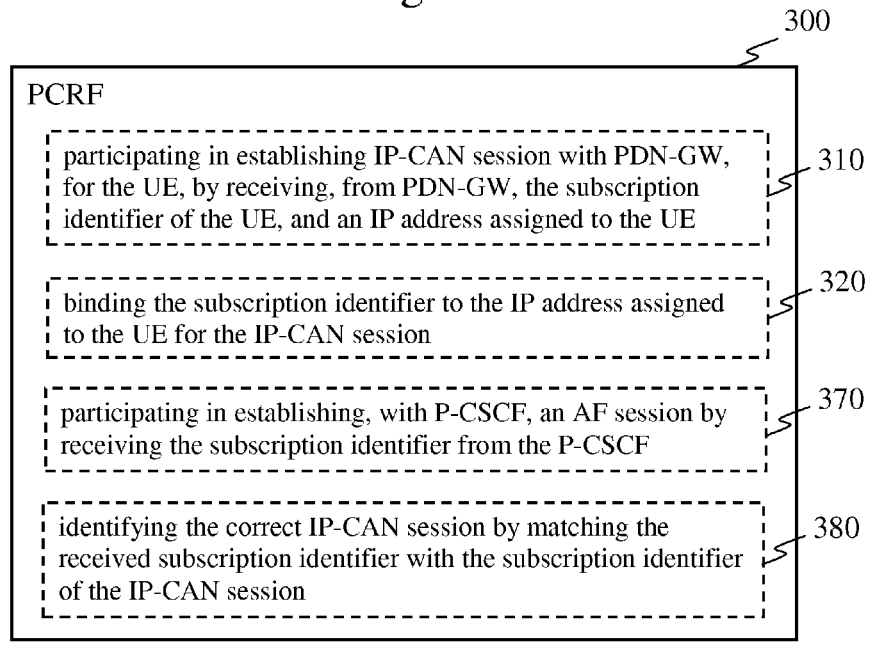
FIGS. 15, 16 and 17 schematically illustrate respectively a PCRF, a P-CSCF and an S-CSCF in three embodiments of the invention.

FIG. 15 schematically illustrates a network node comprising a PCRF 300 in one embodiment of the invention. Such network node may for instance be implemented as illustrated on FIG. 14. PCRF 300 is configured for participating in an IMS registration and session initiation for a UE, wherein UE has a subscription identifier comprising at least one of an IMSI and a MSISDN. The network node hosting the PCRF 300 comprises:
- (i) a first unit 310 (first establishing unit 310) configured for participating in establishing an IP-CAN session with a PDN-GW, for a UE, by receiving, from the PDN-GW, at least
  the subscription identifier of the UE, and
  an IP address assigned to the UE;
- (ii) a second unit 320 (binding unit 320) configured for binding the subscription identifier to the IP address assigned to the UE for the IP-CAN session;
- (iii) a third unit 370 (second establishing unit 370) configured for participating in establishing, with a P-CSCF, an AF session by at least receiving the subscription identifier from the P-CSCF; and
- (iv) a fourth unit 380 (identifying unit 380) configured identifying the correct IP-CAN session by matching the received subscription identifier with the subscription identifier of the IP-CAN session.

The network node comprising a PCRF 300 as illustrated on FIG. 15 may be further configured so that participating, by the second establishing unit 370, in establishing, with the P-CSCF, the AF session comprises: receiving, from the P-CSCF, the subscription identifier of the UE and the IP address assigned to the UE. Optionally, the P-CSCF may also transmit the IMPU to the PCRF.

The network node comprising a PCRF 300 as illustrated on FIG. 15 may be further configured so that identifying, by the identifying unit 380, the correct IP-CAN session by matching the received subscription identifier with the subscription identifier of the IP-CAN session comprises: matching the received subscription identifier and IP address assigned to the UE with the subscription identifier and the IP address associated with the IP-CAN session.

Figure 16:
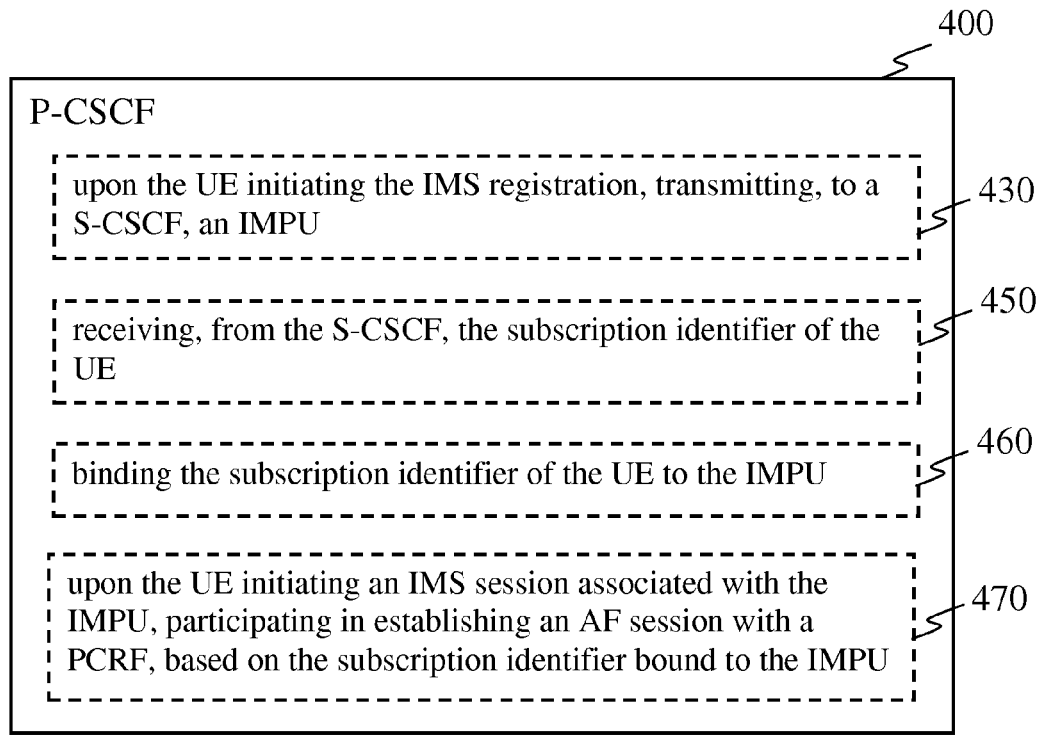

FIG. 16 schematically illustrates a network node comprising a P-CSCF 400 in one embodiment of the invention. Such network node may for instance be implemented as illustrated on FIG. 14. P-CSCF 400 is configured for participating in an IMS registration and session initiation for a UE, the UE having a subscription identifier comprising at least one of an IMSI and a MSISDN. The network node hosting the P-CSCF 400 comprises:
- (i) a first unit 430 (transmitting unit 430) configured for, upon the UE initiating the IMS registration, transmitting, to a S-CSCF, an IMPU;
- (ii) a second unit 450 (receiving unit 450) configured for receiving, from the S-CSCF, the subscription identifier of the UE;
- (iii) a third unit 460 (binding unit 460) configured for binding the subscription identifier of the UE to the IMPU; and,
- (iv) a fourth unit 470 (establishing unit 470) configured for, upon the UE initiating an IMS session associated with the IMPU, participating in establishing an AF session with a PCRF, with the subscription identifier bound to the IMPU.

The network node comprising a P-CSCF 400 as illustrated on FIG. 16 may be further configured for, upon the UE initiating the IMS registration, receiving the IMPU and an IP address assigned to the UE during establishment of an IP-CAN session for the UE.

The network node comprising a P-CSCF 400 as illustrated on FIG. 16 may be further configured so that transmitting, by the transmitting unit 430, to the S-CSCF, the IMPU comprises transmitting a SIP register request to the S-CSCF.

The network node comprising a P-CSCF 400 as illustrated on FIG. 16 may be configured so that binding, by the binding unit 460, the subscription identifier of the UE to the IMPU comprises: binding the IP address assigned to the UE to the IMPU and the subscription identifier of the UE.

The network node comprising a P-CSCF 400 as illustrated on FIG. 16 may be configured so that participating, by the establishing unit 470, in establishing an AF session with the PCRF with the subscription identifier bound to the IMPU comprises: transmitting, to the PCRF, the subscription identifier of the UE and the IP address assigned to the UE. Optionally, the P-CSCF may also transmit the IMPU to the PCRF.

Figure 17:
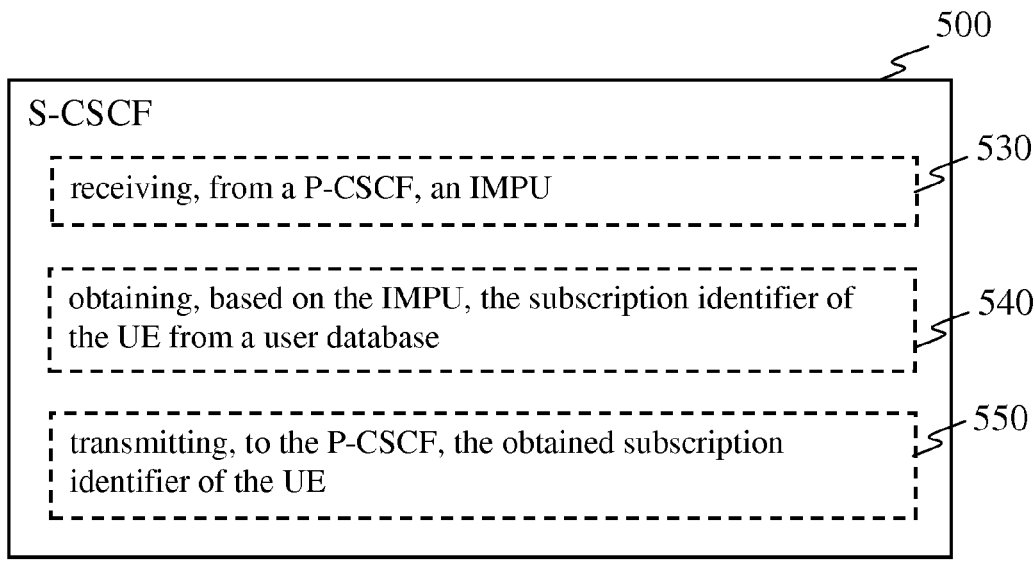

FIG. 17 schematically illustrates a network node comprising an S-CSCF 500 in one embodiment of the invention. Such network node may for instance be implemented as illustrated on FIG. 14. S-CSCF 500 is configured for participating in an IMS registration for a UE, the UE having a subscription identifier comprising at least one of an IMSI and a MSISDN. The network node hosting the S-CSCF 500 includes:
- (i) a first unit 530 (receiving unit 530) configured for receiving, from a P-CSCF, an IMPU;
- (ii) a second unit 540 (obtaining unit 540) configured for obtaining, based on the IMPU, the subscription identifier of the UE from a user database; and
- (iii) a third unit 550 (transmitting unit 550) configured for transmitting, to the P-CSCF, the obtained subscription identifier of the UE.

The network node comprising the S-CSCF 500 may be further configured so that receiving, by the receiving unit 530, from the P-CSCF, the IMPU, comprises: receiving a SIP register request from the P-CSCF.

The network node comprising the S-CSCF 500 may be further configured for, after obtaining the subscription identifier of the UE from the user database, storing the subscription identifier of the UE.

Where the terms "first establishing unit", "binding unit", "second establishing unit", "identifying unit", "transmitting unit", "receiving unit", etc. are used herewith, no restriction is made regarding how distributed these elements may be and regarding how gathered elements may be. That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned first establishing unit, binding unit, second establishing unit, identifying unit, transmitting unit, receiving unit, etc. is replaced by first establishing means, binding means, second establishing means, identifying means, transmitting means, receiving means, etc. respectively, or by first establisher, binder, second establisher, identifier, transmitter, receiver, etc. respectively, for performing the functions of the first establishing unit, binding unit, second establishing unit, identifying unit, transmitting unit, receiving unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of participating in an Internet Protocol (IP) Multimedia Subsystem (IMS) registration and session initiation for a user equipment (UE), the UE having a subscription identifier comprising at least one of a IMSI and a MSISDN, the method comprising:
establishing, by a packet data network gateway (PDN-GW), an IP connectivity access network (IP-CAN) session with a policy and charging rules function (PCRF) for the UE, by transmitting, to the PCRF, at least
the subscription identifier of the UE, and
an IP address assigned to the UE;
binding, by the PCRF, the subscription identifier to the IP address assigned to the UE for the IP-CAN session;
upon the UE initiating the IMS registration, transferring, from a proxy call session control function (P-CSCF) to a serving call session control function (S-CSCF) an IP multimedia public identity (IMPU);
obtaining, by the S-CSCF, based on the IMPU, the subscription identifier of the UE from a user database;
transferring, by the S-CSCF to the P-CSCF, the obtained subscription identifier of the UE;
binding, by the P-CSCF, the transferred subscription identifier of the UE to the IMPU;
upon the UE initiating an IMS session associated with the IMPU, establishing, by the P-CSCF, an application function session towards the PCRF with the subscription identifier bound to the IMPU; and
identifying, by the PCRF, the correct IP-CAN session by matching the received subscription identifier with the subscription identifier of the IP-CAN session.

2. The method of claim 1, wherein the user database is a Home Subscriber Server.

3. The method of claim 1, further comprising:
after obtaining, by the S-CSCF, the subscription identifier of the UE from the user database,
storing, by the S-CSCF, the subscription identifier of the UE.

4. The method of claim 1, further comprising:
upon the UE initiating the IMS registration, receiving, by the P-CSCF, the IP address assigned to the UE, and the IMPU.

5. The method of claim 1, wherein binding, by the P-CSCF, the subscription identifier of the UE to the IMPU comprises:
binding
the IP address assigned to the UE and
the IMPU
to the subscription identifier of the UE.

6. The method of claim 1, wherein establishing, by the P-CSCF, the application function session towards the PCRF comprises:
transmitting, to the PCRF, the subscription identifier of the UE and the IP address assigned to the UE.

7. The method of claim 1, wherein identifying, by the PCRF, the correct IP-CAN session comprises:
matching the subscription identifier and the IP address assigned to the UE with the subscription identifier and the IP address associated with the IP-CAN session.

8. A network node comprising a proxy call session control function (P-CSCF) for participating in an Internet Protocol (IP) Multimedia Subsystem (IMS) registration and session initiation for a user equipment (UE), the UE having a subscription identifier comprising at least one of a IMSI and a MSISDN, the network node being configured for:
upon the UE initiating the IMS registration, transmitting, to a serving call session control function, hereinafter abbreviated as "S-CSCF", an IP multimedia public identity, hereinafter abbreviated as "IMPU", used by the UE during the IMS registration;
receiving, from the S-CSCF, the subscription identifier of the UE;
binding the received subscription identifier of the UE to the IMPU; and,
upon the UE initiating an IMS session associated with the IMPU, participating in establishing an application function session with a policy and charging rules function (PCRF) with the received subscription identifier bound to the IMPU.

9. The network node of claim 8, further configured for:
upon the UE initiating the IMS registration, receiving the IMPU and an IP address assigned to the UE during establishment of an IP connectivity access network (IP-CAN) session for the UE.

10. The network node of claim 8, configured so that binding the subscription identifier of the UE to the IMPU comprises:
binding the IP address assigned to the UE to the IMPU and the subscription identifier of the UE.

11. The network node according to claim 8, configured so that participating in establishing an application function session with the PCRF with the subscription identifier bound to the IMPU comprises:
transmitting, to the PCRF, the subscription identifier of the UE and the IP address assigned to the UE.

12. A network node comprising a serving call session control function (S-CSCF) for participating in an Internet Protocol (IP) Multimedia Subsystem (IMS) registration for a user equipment (UE), the UE having a subscription identifier comprising at least one of a IMSI and a MSISDN, the network node being configured for:
receiving, from a proxy call session control function (P-CSCF) an IP multimedia public identity (IMPU);
obtaining, based on the IMPU, the subscription identifier of the UE from a user database; and
transmitting, to the P-CSCF, the obtained subscription identifier of the UE.

13. The network node of claim 12, wherein the user database is a Home Subscriber Server.

14. The network node of claim 12, further configured for:
after obtaining the subscription identifier of the UE from the user database,
storing the subscription identifier of the UE.

15. A program on a non-transitory computer readable medium comprising instructions which, when executed by a processor of a network node, cause the processor to carry out the functions of the network node according to claim 8.

16. A program on a non-transitory computer readable medium comprising instructions which, when executed by a processor of a network node, cause the processor to carry out the functions of the network node according to claim 12.

* * * * *